US012801390B2

(12) United States Patent
Abhishek Raja et al.

(10) Patent No.: US 12,801,390 B2
(45) Date of Patent: Nov. 17, 2026

(54) CONTROL STACK LOAD ELIMINATION

(71) Applicant: Arm Limited, Cambridge (GB)

(72) Inventors: Abhishek Raja, Niagara Falls, NY (US); Rodney Wayne Smith, Wake Forest, NC (US)

(73) Assignee: Arm Limited, Cambridge (GB)

(*) Notice: Subject to any disclaimer, the term of this patent is extended or adjusted under 35 U.S.C. 154(b) by 17 days.

(21) Appl. No.: 18/982,081

(22) Filed: Dec. 16, 2024

(65) Prior Publication Data

US 2026/0169737 A1 Jun. 18, 2026

(51) Int. Cl.
*G06F 9/38* (2018.01)
*G06F 9/30* (2018.01)
*G06F 21/52* (2013.01)

(52) U.S. Cl.
CPC .......... *G06F 9/3832* (2013.01); *G06F 9/3004* (2013.01); *G06F 9/3806* (2013.01); *G06F 9/3834* (2013.01); *G06F 9/384* (2013.01); *G06F 21/52* (2013.01)

(58) Field of Classification Search
CPC ...... G06F 9/3004; G06F 9/3806; G06F 9/384; G06F 9/3834; G06F 21/52
See application file for complete search history.

(56) References Cited

U.S. PATENT DOCUMENTS

| | | | | |
|---|---|---|---|---|
| 7,089,400 | B1 * | 8/2006 | Pickett | G06F 9/30134 712/E9.05 |
| 10,838,729 | B1 * | 11/2020 | Al-Otoom | G06F 9/384 |
| 11,900,118 | B1 * | 2/2024 | Pape | G06F 9/3826 |
| 2004/0148467 | A1 * | 7/2004 | Hooker | G06F 9/3004 712/E9.023 |
| 2007/0130448 | A1 * | 6/2007 | Jourdan | G06F 9/3824 712/218 |
| 2014/0380022 | A1 * | 12/2014 | Troester | G06F 9/3004 712/216 |

(Continued)

FOREIGN PATENT DOCUMENTS

| | | | |
|---|---|---|---|
| WO | 2023209324 | A1 | 11/2023 |
| WO | 2024047322 | A1 | 3/2024 |
| WO | 2024089383 | A1 | 5/2024 |

OTHER PUBLICATIONS

Martin Weidmann, "Arm A Profile Architecture Developments 2022", Sep. 29, 2022, 10 pages.

(Continued)

*Primary Examiner* — Courtney P Spann
(74) *Attorney, Agent, or Firm* — NIXON & VANDERHYE P.C.

(57) ABSTRACT

Control stack information tracking circuitry tracks, in a last-in-first-out structure, one or more entries tracking items of store target information corresponding to one or more control stack push instructions. Control stack load elimination circuitry determines whether a control stack load elimination condition is satisfied for a given control stack pop instruction, and if satisfied, eliminates a control stack load operation corresponding to the given control stack pop instruction and uses information obtained from an entry of the control stack information tracking circuitry corresponding to a corresponding control stack push instruction to identify load target information for the given control stack pop instruction.

18 Claims, 15 Drawing Sheets

(56) References Cited

U.S. PATENT DOCUMENTS

| | | | | |
|---|---|---|---|---|
| 2015/0067305 | A1* | 3/2015 | Olson | G06F 9/3838 712/225 |
| 2015/0205612 | A1* | 7/2015 | Jackson | G06F 9/3832 712/216 |
| 2020/0034144 | A1* | 1/2020 | Evers | G06F 9/30058 |
| 2023/0104845 | A1* | 4/2023 | Ray | G06F 7/08 711/126 |

OTHER PUBLICATIONS

"The Guarded Control Stack" , Chapter D11, Arm A profile Architecture reference manual extract—Mar. 2024, 30 pages.

* cited by examiner

CONTROL STACK LOAD ELIMINATION

BACKGROUND

Technical Field

The present technique relates to the field of data processing.

Technical Background

One class of attacks mounted against data processing systems may be return oriented programming attacks, where an attacker modifies return state information associated with procedure calls, which may have been saved out to memory during a nested set of function calls. While return state information is stored in memory, the return addresses may be more vulnerable to tampering by an attacker than while it is held in registers. If the return state information is able to be modified by the attacker, the attacker may be able to cause the processing system to execute an incorrect sequence of instructions, e.g. allowing malicious code to be executed and/or expose sensitive information.

SUMMARY

At least some examples of the present technique provide an apparatus comprising:

- processing circuitry to:
  - in response to a control stack push instruction, perform a control stack store operation to request that store target information is stored to a memory system location corresponding to a control stack store target address derived from a control stack pointer; and
  - in response to a control stack pop instruction processed when a control stack load elimination condition is not satisfied, perform a control stack load operation to request that load target information is loaded from a memory system location corresponding to a control stack load target address derived from the control stack pointer;
- control stack information tracking circuitry to track, in a last-in-first-out structure, one or more entries tracking items of store target information corresponding to one or more control stack push instructions; and
- control stack load elimination circuitry to:
  - determine whether the control stack load elimination condition is satisfied for a given control stack pop instruction; and
  - in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction.

At least some examples of the present technique provide a system comprising:

- the apparatus described above, implemented in at least one packaged chip;
- at least one system component; and
- a board, wherein the at least one packaged chip and the at least one system component are assembled on the board.

At least some examples of the present technique provide a chip-containing product comprising the system described above, wherein the system is assembled on a further board with at least one other product component.

At least some examples of the present technique provide a non-transitory computer-readable medium storing computer-readable code for fabrication of the apparatus described above.

At least some examples of the present technique provide a method comprising:

- in response to a control stack push instruction, performing a control stack store operation to request that store target information is stored to a memory system location corresponding to a control stack store target address derived from a control stack pointer;
- tracking, in a last-in-first-out structure provided by control stack information tracking circuitry, one or more entries tracking items of store target information corresponding to one or more control stack push instructions; and
- in response to a given control stack pop instruction:
  - determining whether a control stack load elimination condition is satisfied for the given control stack pop instruction;
  - in response to determining that the control stack load elimination condition is not satisfied for the given control stack pop instruction, performing a control stack load operation to request that load target information is loaded from a memory system location corresponding to a control stack load target address derived from the control stack pointer; and
  - in response to determining that the control stack load elimination condition is satisfied for the given control stack pop instruction, eliminating the control stack load operation corresponding to the given control stack pop instruction and using, as the load target information for the given control stack pop instruction, store target information obtained based on an entry of the control stack information tracking circuitry corresponding to a corresponding control stack push instruction.

Further aspects, features and advantages of the present technique will be apparent from the following description of examples, which is to be read in conjunction with the accompanying drawings.

DESCRIPTION OF EXAMPLES

Figure 1:
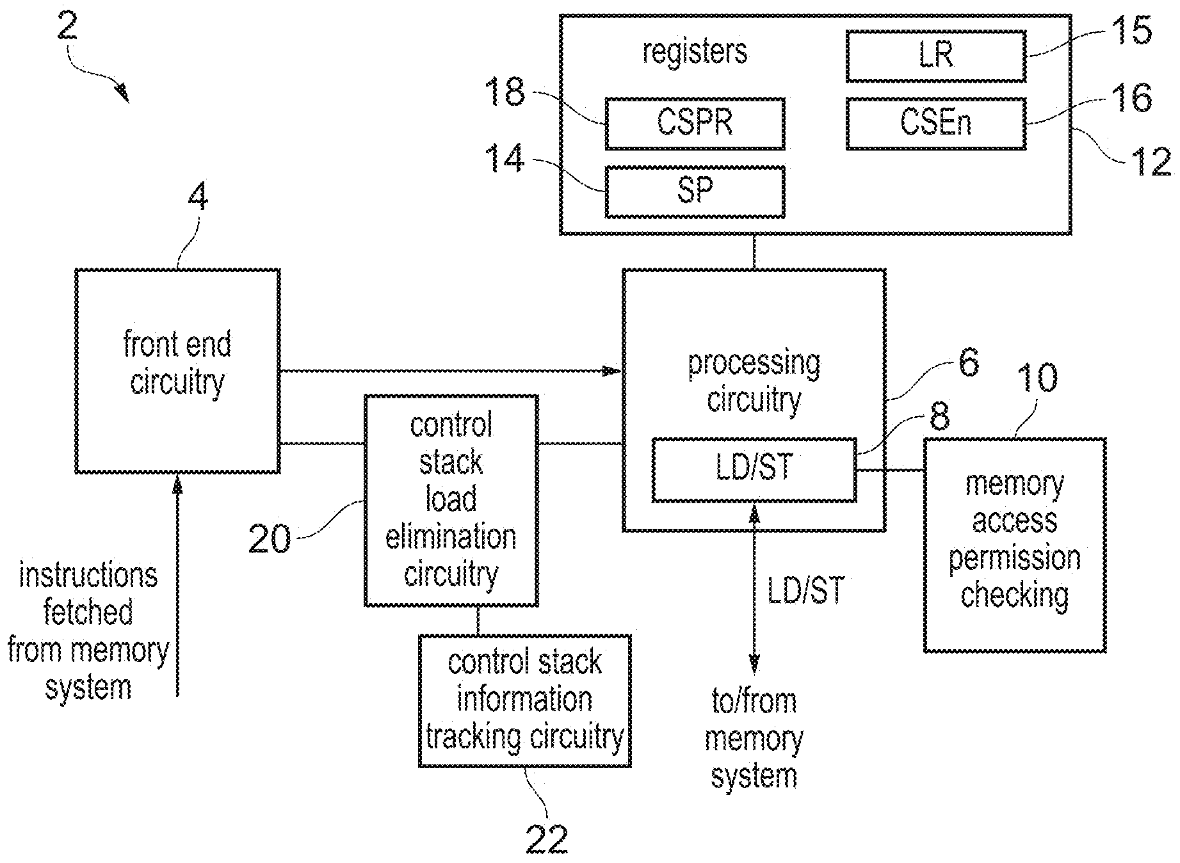
FIG. 1 illustrates an example of an apparatus comprising processing circuitry, control stack information tracking circuitry, and control stack load elimination circuitry.

One type of attack which may be mounted on a data processing apparatus may be a return oriented programming (ROP) attack, where an attacker seeks to corrupt a return address associated with a procedure call to cause a procedure return branch instruction to branch to the wrong address, causing execution of unexpected or malicious code that was not the intended code to execute following the procedure return. If successful, such an attack could risk leakage or corruption of data, faulty code operation, and/or loss of sensitive information. The attacker may exploit the fact that is relatively common for the return address associated with the procedure call to be saved to memory at a point between calling the associated procedure and returning from that procedure to the part of the program being executed before the procedure was called. For example, multiple procedure calls may be nested so that one procedure (an "inner" procedure) is called from within another procedure (an "outer" procedure). When the inner procedure is called, this may cause overwriting of the register used to save the return address of the outer procedure, and so prior to calling the inner procedure the outer procedure may include an instruction to save the return address of the outer procedure to memory. The return address may be more vulnerable to tampering while stored in the memory than while held in a register.

One defence against such ROP attacks may be to support use of a control stack (also known as guarded control stack (GCS), shadow stack, or return address protection stack), which is a data structure stored in memory to which return addresses of procedure calls (as well as other information, such as other function return state information and/or exception return state information) may be saved. The memory region storing the control stack may be provided with at least one protection measure beyond that provided for regular memory address regions. For example, there may be a restriction on what instruction types are allowed to access the control stack region. Accesses to the control stack may be controlled based on a corresponding control stack pointer, which can be used to compute store target addresses for control stack push instructions which store information to the control stack and control stack pop instructions which load information from the control stack. The information saved to the control stack can be used in place of, or to validate, information loaded from memory by non-control stack load instructions, to reduce likelihood of ROP attacks being successful.

Hence, processing circuitry may be provided which, in response to a control stack push instruction, performs a control stack store operation to request that store target information is stored to a memory system location corresponding to a control stack store target address derived from a control stack pointer, and which, in response to a control stack pop instruction processed when a control stack load elimination condition is not satisfied, performs a control stack load operation to request that load target information is loaded from a memory system location corresponding to a control stack load target address derived from the control stack pointer.

While this approach can be helpful for improving robustness against attack, the use of a control stack can introduce additional load/store operations, beyond those that would otherwise be performed if the ROP defence using the control stack was not supported. This can cause a lot of additional overhead for load/store units, which can harm processing performance by introducing additional instruction-to-instruction dependencies and by consuming additional resources in the load/store unit and memory system bandwidth which could otherwise be used for other operations.

The inventors recognised that, for many instances of executing a control stack pop instruction, the load target information can be accurately determined without actually needing to load that information from the control stack structure in memory. For example, control stack push/pop instructions may form pairs of corresponding operations associated with a last-in-first-out (LIFO) data access pattern, and in many scenarios a hardware implemented tracking structure associated with the processing circuitry can be used to track the store target information associated with one or more control stack push instructions, which can then be accessed later to allow elimination of the control stack load operation that would otherwise be issued for a given control stack pop instruction. There may be certain scenarios in which such control stack information tracking cannot be relied upon, but they can be readily detectable by evaluating whether a control stack load elimination condition is, or is not, satisfied. When the control stack load elimination condition is satisfied for a given control stack pop instruction, the control stack load operation for the given control stack pop instruction can be eliminated to reduce overhead and increase processing performance.

Hence, the apparatus may have control stack information tracking circuitry to track, in a last-in-first-out structure, one or more entries tracking items of store target information corresponding to one or more control stack push instructions; and control stack load elimination circuitry to: determine whether the control stack load elimination condition is satisfied for a given control stack pop instruction; and in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction.

This approach may be seen as counterintuitive since one might think that even if the load target information to be popped from the control stack for a given control stack pop instruction can be predicted in advance without waiting for the control stack load operation, a confirmation load would still be needed to verify whether the prediction was correct, so would still consume load/store unit and memory system bandwidth. However it is recognised that the load target information of a control stack pop instruction can be safely predicted in most scenarios without performing a confirmation load, and the scenarios when this is not possible can be readily detectable as part of evaluating whether the control stack load elimination condition is satisfied. Therefore, in practice, the confirmation load is not necessary and so significant load/store bandwidth savings can be achieved without compromising the robustness against ROP attacks. Accordingly, the control stack load elimination technique can be beneficial to processing performance.

The control stack load elimination condition can be evaluated in various ways. In general, the control stack load elimination condition may be any condition which indicates that it would be safe to eliminate the control stack load operation and use the store target information obtained based on information from the control stack information tracking circuitry as the load target information to be returned for the given control stack pop instruction, without checking that store target information against information actually loaded from memory based on the control stack pointer.

In some examples, whether the control stack load elimination condition is satisfied for the given control stack pop instruction is determined based on whether the data value to be loaded corresponding to the control stack load target address for the given control stack pop instruction can be determined based on an entry of the control stack information tracking circuitry associated with a corresponding control stack push instruction.

In some examples, the control stack load elimination condition may be defined in a negative sense, as being satisfied if none of one or more types of event indicating it is unsafe to proceed with control stack load elimination have occurred. Hence, there may be no positive definition of what needs to happen in order for the control stack load elimination condition to be satisfied. Rather, the control stack load elimination circuitry could simply check, following detection of a control stack push instruction, for any of the events indicating that control stack load elimination is unsafe, and if none of those events has occurred, assume that the control stack load elimination condition is satisfied. Which particular events are detected to deduce that control stack load elimination would be unsafe may vary significantly from one implementation to another, depending on which instructions are supported in the instruction set architecture of the processing circuitry, the memory ordering model used, and on the particular micro-architectural implementation of how the control stack information tracking circuitry tracks the store target information.

In some examples, the control stack load elimination circuitry determines whether the control stack load elimination condition is satisfied for the given control stack pop instruction, based on a nesting tracker tracking a level of nesting of control stack push instructions. For example, the nesting tracker can track the number of outstanding control stack push instructions for which corresponding control stack pop instructions have not yet been encountered. For example, the nesting tracker could be implemented using a counter which is adjusted in one direction (e.g. incremented) in response to each control stack push instruction and adjusted in the other direction (e.g. decremented) in response to each control stack pop instruction. Alternatively, the nesting tracker could be a pointer that increments/decrements and keeps track of whether any entries on the control stack are valid and whether there's an overflow condition. Either way, the control stack load elimination condition being satisfied may depend on the current value of the nesting tracker indicating a non-zero number of outstanding control stack push instructions (and on the current number of outstanding control stack push instructions not exceeding the maximum number of control stack push instructions for which corresponding items of store target information can be tracked by the control stack information tracking circuitry). The nesting tracker could be reset to indicate zero outstanding control stack push instructions, in response to detecting any event that indicates that control stack load elimination condition would be unsafe (e.g. any of the control stack load elimination clearing events mentioned below). This approach can be relatively simple (and circuit area-efficient) to implement in hardware for tracking whether it is safe to eliminate control stack load operations for control stack pop instructions.

In some examples, in response to detecting a control stack load elimination clearing event associated with an intervening point of program flow between the corresponding control stack push instruction and a subsequent control stack pop instruction, the control stack load elimination circuitry is configured to clear at least one control stack load elimination tracking indication to ensure that the control stack load elimination condition is not satisfied for the subsequent control stack pop instruction. For example, the at least one control stack load elimination tracking indication could comprise the nesting tracker mentioned above, and/or the entries of the LIFO structure maintained by the control stack information tracking circuitry, and/or other control information that controls control stack load elimination (e.g. an indication of whether the control stack load elimination condition is currently satisfied or not).

A wide variety of events may be detected as the control stack load elimination clearing event. Various examples of control stack load elimination clearing events are discussed below. It will be appreciated that a given system may support any combination of one or more of these types of control stack load elimination clearing event, so in some cases the control stack load elimination circuitry may be detecting more than one type of control stack load elimination clearing event and could clear the at least one control stack load elimination tracking indication in response to any of those types of control stack load elimination clearing event occurring.

In some examples, the control stack load elimination clearing event comprises a control stack store instruction other than the control stack push instruction being detected as occurring at the intervening point of program flow between the corresponding control stack push instruction and a subsequent control stack pop instruction. The correspondence between the store/load data of push/pop instructions may no longer be reliable if there is a risk that an intervening control stack store instruction could have modified the contents of the control stack outside of normal push/pop operations, as it could mean the value which would be loaded by the control stack load operation for the control stack pop instruction may not necessarily be the same as the value which was generated as the store target information for the corresponding control stack push instruction. Therefore, such intervening control stack store instructions of an instruction type other than the control stack push instruction may be treated as a control stack load eliminating clearing event.

In some examples, the control stack load elimination clearing event comprises an instruction to update the control stack pointer. The control stack pointer updating instruction that is treated as the control stack load elimination clearing event may be an instruction of an instruction type other than the control stack push/pop instructions themselves, which may have a side effect of also updating the control stack pointer. For example, the ISA supported by the processing circuitry may support at least one type of instruction for switching which control stack structure in memory is active, by adjusting the value of the control stack pointer. Such a control stack pointer switching instruction may be associated with certain security features, such as checks of whether the incoming stack has a particular "check" value stored at the location pointed to by the incoming control stack pointer, to ensure that it is not possible to circumvent the control stack protection by causing the control stack pointer to be updated to point to an arbitrary region of memory not intended to provide a control stack structure. If the control stack pointer is updated in the intervening period between a control stack push instruction and a control stack pop instruction (other than the LIFO-based increment/decrement of the control stack pointer which would be expected to occur for a nested set of control stack push/pop operations), then the correspondence between the store target information tracked using the control stack information tracking circuitry for the corresponding control stack push instruction and the value which would be loaded in the control stack load operation for the given control stack pop instruction can no longer be trusted as it is possible that the control stack pointer switch could result in the control stack load operation returning a different value to the one tracked using the control stack information tracking circuitry. Therefore, such control stack pointer updating instructions can be an example of a control stack load elimination clearing event, so that a subsequent control stack pop instruction would be treated as requiring its control stack load operation to be executed.

In some examples, the control stack load elimination clearing event comprises a control stack synchronisation instruction which enforces a requirement that an effect of an older control stack store operation is made visible to a younger non-control stack load/store operation for which an address range accessed by the given older control stack store operation overlaps with an address range accessed by the younger non-control stack load/store operation. The younger non-control stack load/store operation is an instruction which is younger (later in program order) than the control stack synchronisation instruction. The given older control stack store operation is an instruction which is older (earlier in program order) than the control stack synchronisation instruction. An instruction set architecture (ISA) may prescribe a certain class of load/store operations (including the load/store operations triggered by the control stack push/pop instructions) as being "control stack load/store operations" allowed to access control stack regions of memory and another class of load/store operations as being "non-control stack load/store operations" not allowed to access such control stack regions under certain conditions (e.g. for particular control settings defined by page table attributes).

Such a control stack synchronisation instruction can be provided in an ISA to support micro-architectural implementations which, by default, assume that there is no interaction between control stack load/store operations and non-control stack load/store operations as, given the higher security associated with the control stack data structure, it is unlikely that non-control stack load/store operations would specify an address which overlaps with the addresses accessed by control stack load/store operations. By supporting the control stack synchronisation instruction, this gives a mechanism by which software can flag the rare cases when it is expected that non-control stack load/store operations are required to interact with addresses for which older control stack store operations have stored data to memory. This gives flexibility for some (but not all) hardware system designers to implement load/store micro-architectural hardware circuitry so that, in absence of the control stack synchronisation instruction, it may not be needed for any hazard checks to be performed between control stack load/store operations and non-control stack load/store operations. Alternatively, the micro-architectural implementations may choose to process both control stack and non-control stack load/store operations with a common processing pipeline and hazarding logic, in which case the control stack synchronisation instruction may have little effect if the control stack accesses are already synchronized with non-control stack accesses. Either way, the definition of a control stack synchronisation instruction in the ISA may enable additional design choices for system designers which may not be possible if the ISA did not support such a control stack synchronisation instruction.

As some software executed by the apparatus described above may include the control stack synchronisation instruction, so that if that software requires interaction between control stack and non-control stack load/stores (e.g. if it is desired to copy the contents of the control stack to another region of memory to allow evaluation of call/return history), and that software is executed on an processor implementation which, in the absence of detecting an intervening control stack synchronisation instruction between an older control stack store operation and a younger non-control stack load/store operation, would permit a younger non-control stack load/store operation to give a result which fails to observe the result of an older control stack store operation to the same address, the control stack synchronisation instruction can force the hardware of the processing circuitry to ensure that the younger non-control stack load/store operation sees the effect of the older control stack store operation (e.g. by deferring processing of the younger non-control stack load/store operation until the older control stack store operation has actually updated memory and is no longer pending in a store buffer).

The presence of a control stack synchronisation instruction in the executed software may indicate that there is a risk that there could be interaction between control stack and non-control stack load/store operations, or that otherwise the control stack load/store operations need to be made visible to external observers other than the software process that executed the instructions causing those control stack load/store operations. In this case, there could be a risk that the contents of the control stack structure in memory could change under external influence. Therefore, it can be desirable to treat intervening control stack synchronisation instructions as one of the examples of a control stack load elimination clearing event checked by the control stack load elimination circuitry, to reduce risk that the value which would be loaded by the control stack load operation no longer corresponds to the store target information tracked by the control stack information tracking structure for a corresponding control stack push instruction.

Another example of the control stack load elimination clearing event can be a cache maintenance instruction for triggering invalidation or writeback of one or more entries of a cache. Such cache maintenance instructions may be a mechanism for ensuring that external observers of memory gain visibility of memory updates carried out for store operations issued by the processing circuitry, and may cause guarded control accesses to behave like regular memory accesses when being ordered with respect to the cache maintenance instructions.

Another example of the control stack load elimination clearing event can be a translation lookaside buffer (TLB) invalidation instruction for triggering invalidation of one or more entries of a translation lookaside buffer, or a memory synchronisation request requesting an acknowledgement that one or more preceding TLB invalidation requests are guaranteed to complete. Such TLB invalidations may be used in scenarios when memory address space allocations are reconfigured by an operating system. For example, following a TLB invalidation it is possible that the control stack pointer no longer maps to the same physical address in memory or that access permissions checked may no longer be valid. Therefore, TLB invalidation instructions or memory synchronisation requests detected at an intervening point program flow between an earlier control stack push instruction and a later control stack pop instruction can be treated as the control stack load elimination clearing event so that the control stack load operation is not eliminated for the subsequent control stack pop instruction (control stack load elimination may resume once new push/pop pairs start to be formed subsequent to the control stack load elimination clearing event). In some implementations, a memory synchronisation request received from a remote source may be used to trigger acknowledgement that a group of preceding TLB invalidation requests are guaranteed to be completed, and so it may be more efficient to detect the memory synchronisation request as the control stack load elimination clearing event, rather than detecting each individual TLB invalidation request.

Another example of the control stack load elimination clearing event can be a flush event associated with the intervening point of program flow, to cause one or more instructions younger than the intervening point of program flow to be flushed from being processed by the processing circuitry. For example, the flush event may be caused by a branch misprediction or another reason why speculative processing has been carried out incorrectly. A branch misprediction could risk, for example, one or more instances of a control stack push instruction or control stack pop instruction being incorrectly predicted as being executed (or incorrectly predicted as not being required when they should have been executed), so that there can end up being a mismatch in the tracking of the LIFO relation between corresponding control stack push/pop instructions. Hence, on a pipeline flush caused by branch misprediction or other incorrect speculation, the information used to track the control stack load elimination condition can be cleared to ensure a control stack load operation is not eliminated for a subsequent control stack pop instruction (following the clearing of potential incorrect information, the LIFO tracking could be reconstructed after the misprediction so that load elimination can resume). There can also be flush events that are not associated with incorrect speculation, such as the flush described below which may be triggered in cases where read permissions are not satisfied when checked at the time of processing a control stack store operation for a control stack push instruction, and such flush events may also be treated as a control stack load elimination clearing event.

The apparatus may comprise memory access permissions checking circuitry to determine, based on memory access permission information associated with a target address of a given load/store operation; whether the given load/store operation is permitted. For example, the memory access permissions checking circuitry could be a memory management unit (MMU) for which the memory access permission information is defined in page table structures stored in memory, the page table structures also defining address translation mapping information for controlling translation of memory addresses. Alternatively, the memory access permissions checking circuitry could be a memory protection unit (MPU) which provides registers storing memory access permission information defining regions of address space for which certain access permissions apply, the MPU supporting regions of non-power-of-2 numbers of bytes.

In some examples, in response to the control stack store operation triggered by the control stack push instruction, the memory access permissions checking circuitry checks whether the memory access permission information associated with the control stack store target address indicates that load operations are permitted, and, in response to determining that load operations are not permitted for the control stack store target address, triggers a response action to ensure a subsequent control stack pop instruction is processed without eliminating the control stack load operation. One would expect that a control stack store operation would not require read permission (permission to perform a load operation to the target address) in order to be processed, so it may seem counter-intuitive to trigger a flush when a store operation is to an address without read permission. However, in cases where the control stack load operation for a subsequent control stack pop instruction is eliminated, there would be no load operation issued at the time of processing the control stack pop instruction which could be used to trigger the memory access permissions checking circuitry to check for read permission. As the control stack push/pop instructions are expected to form pairs of accesses sharing the same address, the read permissions can be checked at the time of performing the control stack store operation associated with the control stack push instruction, so that the control stack load elimination technique still respects any read permission restrictions that may have been imposed on the control stack load target address associated with the control stack load operation that would otherwise have been performed for a control stack pop instruction.

The response action taken if the store target address does not have read permissions could take various forms, but in some examples the response action comprises flushing operations younger than the control stack push instruction for which the memory access permissions checking circuitry detected that load operations are not permitted for the control stack store target address, without flushing the control stack push instruction itself. This flush event can be an example of a control stack load elimination clearing event, so by clearing any state used to indicate that control stack load elimination is safe in response to the read permission being detected as not present for the control stack store target address of the control stack store performed for a control stack push instruction, this will ensure that the control stack load operation for the subsequent control stack pop instruction is not eliminated, and so a control stack load operation would be issued, and the violation of read permissions can then be detected at that time and used to trigger a memory fault as needed.

In some examples, the memory access permission information may indicate whether a region of memory comprising the target address is designated as a control stack type region reserved for access by control stack load/store operations. Hence, the memory access controls may support an attribute used to define a dedicated type of memory region reserved for access by control stack load/store operations, as distinct from normal memory regions which may have a different memory region type classification. This can be helpful for increasing the security associated with the control stack structure accessed via the control stack pointer.

For example, the memory access permissions checking circuitry may determine that the given load/store operation is not permitted when the given load/store operation is a control stack load/store operation and the memory access permission information associated with the target address of the given load/store operation indicates that the target address is in a region of memory not designated as the control stack type region. This reduces the risk of a control stack load/store operation accidentally accessing the wrong region of memory (e.g. due to coding error or an attacker managing to corrupt the control stack pointer) and straying into memory regions not intended to be used as the control stack, which could otherwise risk the value returned by the control stack load for a control stack pop instruction being incorrect and used to cause program flow to be directed to incorrect program code in an unsafe manner. Such errors where a control stack load/store operation accesses a memory region not designated as the "control stack type" region can be detected and may cause a fault to be signaled.

Also, the memory access permissions checking circuitry may determine that the given load/store operation is not permitted (at least when the given load/store operation is a store operation) when the given load/store operation is not a control stack load/store operation and the memory access permission information associated with the target address of the given load/store operation indicates that the target address is in a region of memory designated as the control stack type region. This protects against non-control stack load/store operations tampering with the contents of the control stack. Some implementations may also impose this restriction on non-control stack load operations to the control stack type memory region. Other implementations may allow non-control-stack load operations to access the control stack type memory region.

Here, a control stack load/store operation may be considered to be a load/store operation triggered by a limited class of instructions allowed to cause access to the control stack type memory region. The control-stack-access-permitted class of instructions may include at least the control stack push instruction and control stack pop instruction described above, but could also include one or more other types of designated instructions reserved for accessing the control stack (which have a different encoding to other types of load/store instructions not permitted to access the control stack). By restricting the types of instructions allowed to generate control stack load/store operations, this reduces the attack surface available to an attacker, since the majority of load/stores carried out when executing a given program may use regular load/store instructions not of the control-stack-access-permitted class of instructions, so an attack compromising address operands for those regular load/store instructions would not be able to cause the non-control stack load/store operations issued in response to those regular load/store operations to read or corrupt the contents of the control stack.

In some examples, the control stack push instruction and control stack pop instruction may be instructions for pushing/popping entries to/from the control stack, which do not themselves trigger a corresponding procedure calling branch or procedure return branch. In some ISAs supporting use of the control stack, the push/pop operations for interacting with the control stack may be triggered by separate instructions from the procedure call/return branch instructions that perform branches at the start and end of procedure calls (even if the information being pushed/popped to/from the control stack includes a return address for such a procedure call/return). Hence, in some implementations using the control stack load elimination, the eliminated loads may be control stack load operations triggered by a standalone control stack pop instruction which does not also trigger an associated procedure return branch operation.

However, in other ISA implementations, the control stack push/pop operations may be layered on top of existing instructions for triggering procedure calling branch operations or procedure return branch operations, by supporting a control stack enabled mode in which the processing circuitry can provide greater protection to the return address of a procedure call by storing the return address to the control stack automatically in response to the procedure calling branch instruction (rather than requiring a further control stack push instruction separate from the procedure calling branch instruction). Similarly, a procedure return branch instruction executed in the control stack enabled mode may, in addition to a procedure return branch operation (and in absence of the control stack load elimination condition being satisfied), also trigger an operation to obtain or validate the return address for the procedure return branch operation based on load target information obtained from the control stack. The value loaded from the control stack can either be used directly as the return branch target address of the procedure return branch instruction, or used to verify whether a return branch target address provided as a separate operand for the procedure return branch instruction can be trusted. Hence, by supporting the control stack enabled mode in which procedure calling branch instructions and procedure return branch instructions can be treated as control stack push instructions and control stack pop instructions respectively, this can improve code density by reducing the need for software to include separate instructions for the branch and control stack push/pop respectively, and also makes the protection provided based on the control stack available to legacy function code written without knowledge that the control stack functionality is provided on the apparatus.

Hence, in some examples, the control stack push instruction comprises a procedure calling branch instruction processed in a control stack enabled mode, for which the store target information stored in the control stack store operation comprises a return address, and in response to the procedure calling branch instruction, the processing circuitry is configured to branch to a call target address specified by the procedure calling branch instruction. Similarly, the control stack pop instruction may comprise a procedure return branch instruction processed in the control stack enabled mode, and in response to the procedure return branch instruction processed in the control stack enabled mode, the processing circuitry is configured to branch to a return branch target address identified by, or validated using, the load target information. In some implementations, the control stack load elimination circuitry described above may only support the control stack load elimination technique for procedure calling branch instructions and procedure return branch instructions, not for other more general types of control stack push/pop instruction. Other examples may also support control stack load elimination for more general types of control stack push/pop instruction.

In some examples, the processing circuitry may by default be configured to operate in the control stack enabled mode, with no option to disable the control stack enabled mode. In this case, any procedure calling/return branch instruction may be considered to be processed in the control stack enabled mode.

In other examples, the processing circuitry may be configurable to operate in either the control stack enabled mode or a control stack disabled mode, depending on a current value of control state information which selects which mode is active. In this case, if the procedure calling branch instruction is processed in the control stack disabled mode, the control stack store operation would not be performed. Similarly, if the procedure calling branch instruction is processed in the control stack disabled mode, the control stack load operation can be eliminated (e.g. by not issuing a control stack load micro-operation in response to the procedure calling branch instruction) regardless of whether the control stack load elimination condition would have been satisfied.

For the procedure calling branch instruction, in addition to triggering a branch to a call target address specified by the procedure calling branch instruction (and if executed in the control stack enabled mode, the control stack store operation), the procedure calling branch instruction may also cause the processing circuitry to write a return address to a register (e.g. a link register). The return address may be computed relative to the address of the procedure calling branch instruction itself (e.g. as the address of the instruction which follows on contiguously in the memory address space after the procedure calling branch instruction). For example, the return address may correspond to the sum of the address of the procedure calling branch instruction and an increment value corresponding to the instruction size of the procedure calling branch instruction.

In some examples, the processing circuitry may support the possibility of performing a control stack return address check in response to a procedure return branch instruction processed in the control stack enabled mode. The control stack return address check could either be considered permanently enabled for each instance of a procedure return branch instruction processed in the control stack enabled mode (without any control register state information being supported for enabling/disabling the control stack return address check), or the control stack return address check could be selectively enabled/disabled for a procedure return branch instruction processed in the control stack enabled mode depending on control register state information indicating whether the control stack return address check is enabled or disabled. Either way, if the control stack return address check is enabled and the control stack load operation is not eliminated, the control stack return address check may comprise comparing whether an address indicated by an address operand of a given procedure return branch instruction matches the return branch target address identified by, or validated using, the load target information loaded from memory by the control stack load operation, and signalling an exception in response to mismatch being detected in the comparison. The control stack return address check can be useful to allow software to be interrupted in scenarios where the return address provided as the address operand did not match the value returned from the control stack return stack, which can be a sign that the system is under attack or has encountered programming errors. Signalling the exception can cause supervisory software to be processed to examine what has happened and determine how to respond.

However, if the control stack load operation is eliminated, then no control stack load operation is executed, but nevertheless, the architectural definition of the control stack return address check may still need to be respected. The inventors have recognised that a return address obtained from the store target information tracked by the control stack information tracking circuitry can be used in place of the value loaded by the control stack load operation, in cases where the control stack load operation is eliminated. Also, the performance of the control stack return address check can be triggered by a branch micro-operation issued to the processing circuitry in response to the procedure return branch instruction, rather than being triggered by a control stack load micro-operation (which has been eliminated). Hence, in some examples, in response to a branch micro-operation issued to the processing circuitry in response to a given procedure return branch instruction processed in the control stack enabled mode when the control stack load operation is eliminated, when a control stack return address check is enabled for the given procedure return branch instruction, the processing circuitry is configured to: determine, in response to the branch micro-operation, whether an address indicated by an address operand of the given procedure return branch instruction matches the return branch target address identified by, or validated using, the load target information tracked by the return address tracking circuitry for the corresponding procedure calling branch instruction; and signal an exception in response to detecting a mismatch between the address indicated by the address operand of the given procedure return branch instruction and the return branch target address. By making the branch micro-operation be responsible for reporting of the exception caused by a failed control stack return address check, this enables the architectural definition of the procedure return branch instruction to be respected even if the control stack load operation has been eliminated.

Some examples may support a memory synchronisation request received from a remote requester to request an acknowledgement that one or more preceding translation lookaside buffer (TLB) invalidation requests are guaranteed to complete (the timing of acknowledging the memory synchronisation request may also be delayed until after completion of any outstanding memory accesses that use old translations being invalidated by the one or more preceding TLB invalidation requests). In some examples, in response to receipt of the memory synchronisation request from a remote requester when the given control stack pop instruction for which the control stack load operation has been eliminated is not yet committed or flushed, the processing circuitry is configured to defer responding to the memory synchronisation request with the acknowledgement until the given control stack pop instruction for which the control stack load operation has been eliminated is guaranteed to be committed or is flushed from being processed by the processing circuitry. For example, the given control stack pop instruction can be considered guaranteed to be committed when all older operations than the given control stack pop instruction have been committed.

Such a memory synchronisation request can be used to implement distributed virtual memory techniques, where a number of distributed devices, processors or systems share a virtual address space to address respective regions of memory storage. To ensure consistency of data access, TLB invalidation requests may be sent by a remote requester to request that TLB entries meeting certain conditions are invalidated from a TLB associated with the processing circuitry. To reduce the performance cost of acknowledging such TLB invalidation requests (which would be costly if there was a need to acknowledge each TLB invalidation request individually), it can be useful to support a memory synchronisation request which may cause processing circuitry to issue an acknowledgement that any previously received TLB invalidation request is guaranteed to complete. The remote requester which issued such TLB invalidation requests may be waiting for such acknowledgement before proceeding with dependent operations which require a guarantee that there can be no stale address mapping information resident in a TLB within a given synchronisation domain.

However, if such an acknowledgement was sent to the remote requester in a period when a control stack pop instruction for which the control stack load operation is eliminated is still outstanding, there could be a risk of architectural ordering violations caused by subsequent instructions at the remote requester using any new translations/access permissions in force after the TLB invalidations associated with the memory synchronisation request while an outstanding instruction still remains which may still use the older translations/access permissions (namely, the control stack pop instruction which is effectively processed based on the older access permissions because its read permission was checked at the time of the earlier control stack push instruction as described above). To reduce risk of this ordering violation, the acknowledgement of the memory synchronisation request can be deferred until either the given control stack pop instruction is flushed from the pipeline or the given control stack pop instruction is guaranteed to be committed, so that any dependent operations at the remote requester, which rely on a guarantee that there can be no outstanding operations using the old translation information and/or access permissions, can safely proceed without ordering violations.

In some examples, in absence of a control stack synchronisation instruction occurring in program order between a given older control stack store operation and a given younger non-control stack load/store operation for which an address range accessed by the given older control stack store operation overlaps with an address range accessed by the given younger non-control stack load/store operation, the processing circuitry is configured to permit the given younger non-control stack load/store operation to yield a result which fails to observe a result of the given older control stack store operation. In other words, it is possible for the older control stack store operation to overwrite the data written by a younger non-control stack store operation, or for the younger non-control stack load operation to read a value that does not consider the data written by the given older control stack store operation. As noted above, supporting the control stack synchronisation instruction can be helpful to reduce the need for hazarding between control stack and non-control stack load/store instructions. This can also be exploited for control stack load elimination, because it means that, in absence of an intervening control stack synchronisation instruction, one can assume that there will be no external access that changes the control stack in the period between a corresponding pair of control stack push/pop instructions, which can be useful because it means there is no need to check at the time of the control stack pop instruction whether the prediction of its load target information based on the store target information tracked by the control stack information tracking structure was correct.

In some examples, when the control stack load operation has been eliminated for the given control stack pop instruction, the processing circuitry may allow the given control stack pop instruction to commit without issuing a confirmation load operation to check whether the store target information obtained based on the control stack information tracking circuitry matches a data value stored at the memory system location corresponding to the control stack load target address derived from the control stack pointer. This can be different from many other prediction schemes, such as memory renaming, for which one would expect that if a load is effectively eliminated based on a prediction (by allowing a dependent operation to proceed based on a predicted load target value), a checking load should be performed later to verify whether the value obtained from memory matches the prediction (such prediction schemes may allow dependent operations to be performed earlier in the case when the prediction is correct, but would not allow elimination of the load/store system bandwidth incurred by the confirmation load). In contrast, with the control stack load elimination technique discussed above, there is no need for a confirmation load as the known LIFO access pattern between corresponding pairs of control stack push/pop instructions means that the value which would have been loaded by the control stack load operation can be determined with certainty in absence of any intervening control stack load elimination clearing event. Hence, the confirmation load can also be eliminated, which can be extremely beneficial as otherwise the confirmation loads for control stack pop instructions could occupy many slots within load buffer structures, so eliminating the confirmation loads can preserve those slots for other load operations, improving performance as it is less likely that loads have to be stalled due to insufficient load processing bandwidth (buffer slots).

In some examples, in response to the given control stack pop instruction when the control stack load operation has been eliminated, the processing circuitry may apply a same adjustment to the control stack pointer that would have been made in a case when the control stack load operation is not eliminated. Hence, even though the control stack load operation is eliminated, the corresponding control stack pointer adjustment can still be triggered. For example, the control stack pointer adjustment may comprise an increment or decrement of the stack pointer to reflect the fact the control stack load operation is popping an entry from the stack, so that the next such control stack load should access the next youngest entry on the stack after the entry just popped. This ensures that subsequent accesses based on the control stack pointer still access the intended control stack entry.

The control stack information tracking circuitry can be implemented in a variety of different ways.

In some examples, the control stack information tracking circuitry comprises a control stack load renaming structure. In response to detecting a control stack push instruction decoded by instruction decoding circuitry, the control stack load elimination circuitry is configured to update the control stack load renaming structure to specify information identifying the store target information associated with the control stack push instruction. The information stored on the control stack load renaming structure could identify the store target information directly, or indirectly (e.g. using a register specifier identifying a physical register that stores the corresponding store target information). Either way, the information tracked on the control stack load renaming structure can then be used when processing corresponding control stack pop instructions to avoid needing to access the control stack in memory to obtain the corresponding load target information. For example, the control stack load renaming structure could be a dedicated LIFO buffer implemented in hardware (rather than as a data structure in memory), which is separate from any call-return stack circuitry used by branch prediction circuitry to predict return addresses of procedure return branch instructions for the purpose of predicting sequences of instruction fetch addresses.

However, another approach for implementing the control stack information tracking circuitry may be that, in an example where the control stack push/pop instructions comprise procedure calling/return branch instructions processed in the control stack enabled mode as discussed above, the control stack information tracking circuitry may comprise call-return stack circuitry used by branch prediction circuitry to predict the return branch target address of the procedure return branch instruction, wherein the branch prediction circuitry is configured to update the call-return stack circuitry based on return addresses derived from instruction addresses predicted to correspond to procedure calling branch instructions. A branch predictor can be provided to predict program flow to enable instructions beyond a branch to be fetched before the outcome of that branch is known. A branch predictor may often have a call-return stack to record, in a LIFO structure, the predicted return addresses associated with instructions predicted to be procedure calling branch instructions, which can be used to predict the target addresses for subsequent instructions predicted to be procedure return branch instructions. Hence, as a hardware structure for tracking return addresses may already be available within the branch predictor, this structure can be reused as the control stack information tracking circuitry to support control stack load elimination. This can reduce circuit overhead as there is no need to maintain a separate return address tracking structure in addition to the call-return stack.

In some examples which reuse the call-return stack circuitry of the branch predictor as the control stack information tracking circuitry, the control stack data elimination circuitry is configured to determine whether the control stack load elimination condition is satisfied for the given procedure return branch instruction, based on a control stack-load-elimination-safety indication provided by the branch prediction circuitry indicating whether it is safe to eliminate the control stack load operation for the given procedure return branch instruction based on the return branch target address being predicted using the call-return stack circuitry. In some scenarios, it may not be considered safe to rely on the call-return stack circuitry of the branch predictor for supporting control stack load elimination. For example, the call-return stack circuitry of the branch predictor may have a limited number of entries, so could overflow if too many procedure calling branch instructions are predicted to occur, risking misprediction of return addresses for subsequent procedure return branch instructions. In scenarios of overflow of the call-return stack circuitry, an indication of a return address from the call-return stack circuitry for a given procedure calling branch instruction may not be reliable and so control stack load elimination may be suppressed.

Hence, in some examples, in response to generating a prediction of the return branch target address of the given procedure return branch instruction in a period following an earlier detection of overflow of the call-return stack circuitry: the branch prediction circuitry is configured to generate the prediction-safety indication to indicate that it is unsafe to eliminate the control stack load operation for the given procedure return branch instruction. The period in which the control stack load operation is indicated as unsafe may end either when a subsequent flush event resets the tracking indicators to an initial state, or when it is decided, based on a counter incremented in response to each procedure calling branch instruction detected since the overflow and decremented for each procedure return branch instruction, that the number of outstanding return branch instructions which could not have their return addresses predicted based on the call-return stack has reduced to zero, so that subsequently detected return branch instructions can be safely predicted once more based on the call-return stack.

Regardless of the particular way the control stack information tracking circuitry is implemented, in some examples, the control stack load elimination circuitry may eliminate the control stack load operation prior to a load micro-operation corresponding to the control stack load operation being issued to the processing circuitry for execution. Hence, in cases where the control stack load operation is eliminated, there is no need to consume any slots for the control stack load operation within a load buffer or other structure for processing loads, which can conserve bandwidth which can be used to increase performance for other non-control stack load operations.

In some examples, the apparatus comprises load buffering circuitry to buffer pending load operations prior to issuing the load operation to a memory system, and the load buffering circuitry is shared for use by both control stack load operations specifying addresses derived from the control stack pointer and non-control stack load operations specifying addresses determined independent of the control stack pointer.

As mentioned above, the ISA supported by the processing circuitry may support a control stack synchronisation instruction which can be beneficial, from an architectural point of view, to allow support for hardware implementations which separate processing of control stack and non-control stack load operations into separate pipelines associated with separate load buffering circuitry, to eliminate cost of hazard checks between control stack and non-control stack loads respectively. However, such an implementation is not essential and other examples may use a shared pipeline, with shared load buffering circuitry, to handle both control stack and non-control stack loads. The control stack load elimination technique described above, while also beneficial in an implementation with a dedicated control stack load pipeline, can be particularly beneficial for implementations which share the same load pipeline for both control stack and non-control stack loads, because in such an implementation the control stack load operations triggered by control stack pop instructions would occupy load buffer slots which therefore are not available for handling non-control stack loads. By supporting control stack load elimination as discussed above, load processing bandwidth can be conserved and processing of other non-control stack loads can be faster.

In some examples, the control stack load elimination circuitry is configured to determine whether the control stack load elimination condition is satisfied for the given control stack pop instruction, independent of any address comparison between the control stack load target address of the control stack load operation and the control stack store target address of the control stack store operation issued in response to the corresponding control stack push instruction. Hence, when eliminating the control stack load operation, there is no need to invoke store-to-load forwarding circuitry which compares addresses of store operations and load operations to identify opportunities to forward data from a store operation to a load operation to avoid the load actually needing to access memory. The control stack load elimination circuitry can detect the relation between control stack store/load operations based on tracking the LIFO nature of nested push/pop operations, rather than requiring address comparisons between store/load operations.

Specific examples are now described with reference to the drawings.

FIG. 1 schematically illustrates an example of a data processing apparatus 2. In some examples, the data processing apparatus is a central processing unit (CPU) or other processor capable of instruction execution. The apparatus 2 comprises front-end circuitry 4 for fetching instructions from a memory system, decoding the instructions, and issuing the instructions for processing. The apparatus 2 comprises processing circuitry 6 for executing the issued instructions using operands obtained from registers 12, to generate processing results which can be written back to the registers 12. The processing circuitry 6 may have various execution units (most of which are not shown in FIG. 1 for conciseness) for executing different classes of instructions (e.g. execution units not illustrated may include scalar or vector arithmetic/logic units (ALUs), branch units for executing branch instructions, etc.). The execution units include a load/store unit 8 for performing load/store operations in response to load/store instructions executed by the processing circuitry 6. A load operation comprises loading data from at least one memory system location corresponding to a load target address and writing the load target data to at least one destination register, while a store operation comprises storing store target data obtained from at least one source register to at least one memory system location corresponding to a store target address. The apparatus 2 has memory access permission checking circuitry 10 (e.g. a memory management unit, MMU, or memory protection unit, MPU) for checking whether memory access permissions associated with a load/store target address permit the requested load/store operation to be performed. For example, the memory access permissions for a given address may define whether read permission is granted (so that load operations can be performed to that address) and/or whether write permission is granted (so that store operations can be performed to that address). The permissions may also define other restrictions on types of instruction or operating states of the processing apparatus 2 which are or are not allowed to access a given memory address.

The registers 12 may include a stack pointer register 14 used to provide a stack pointer for controlling access to a software-managed stack structure in memory. Certain (non-control-stack-related) instructions may cause a load/store operation to be performed to an address derived from the stack pointer stored in the stack pointer register 14.

The registers also include a link register (LR) 15, which is a register designated for storing a return address for a procedure (function) call.

Separate from the stack pointer register 14, a control stack pointer register (CSPR) 18 is provided to provide a control stack pointer which is used to generate load/store target addresses for control stack load/store operations triggered by a dedicated class of control-stack-accessing instructions. The control stack pointer in CSPR 18 points to a location in a control stack data structure stored in the memory system, which is associated with additional security measures not provided for the regular software-managed stack structure accessed using the stack pointer register 14. For example, the access permissions enforced by the memory access permission checking circuitry 10 may restrict which types of instructions are allowed to access a region of memory designated as being of a control stack region type. In some examples, writes to the control stack pointer register (CSPR) 18 may be subject to privilege-based restrictions, preventing writes to the CSPR 18 being possible in at least one privilege level so that the least privileged operating state of the processing circuitry 6 allowed to cause a write to the stack pointer register 14 may not be able to cause writes to the CSPR 18.

In some examples, the registers 12 may also include a control register providing a control stack enable control value (CSEn) 16, which is used to selectively enable or disable whether the apparatus 2 is currently in a control stack enabled mode. Certain instructions, when processed in the control stack enabled mode, may cause control stack load/store operations to be performed to cause data to be read/written to a memory location associated with an address derived from the control stack pointer in CSPR 18.

Figure 2:
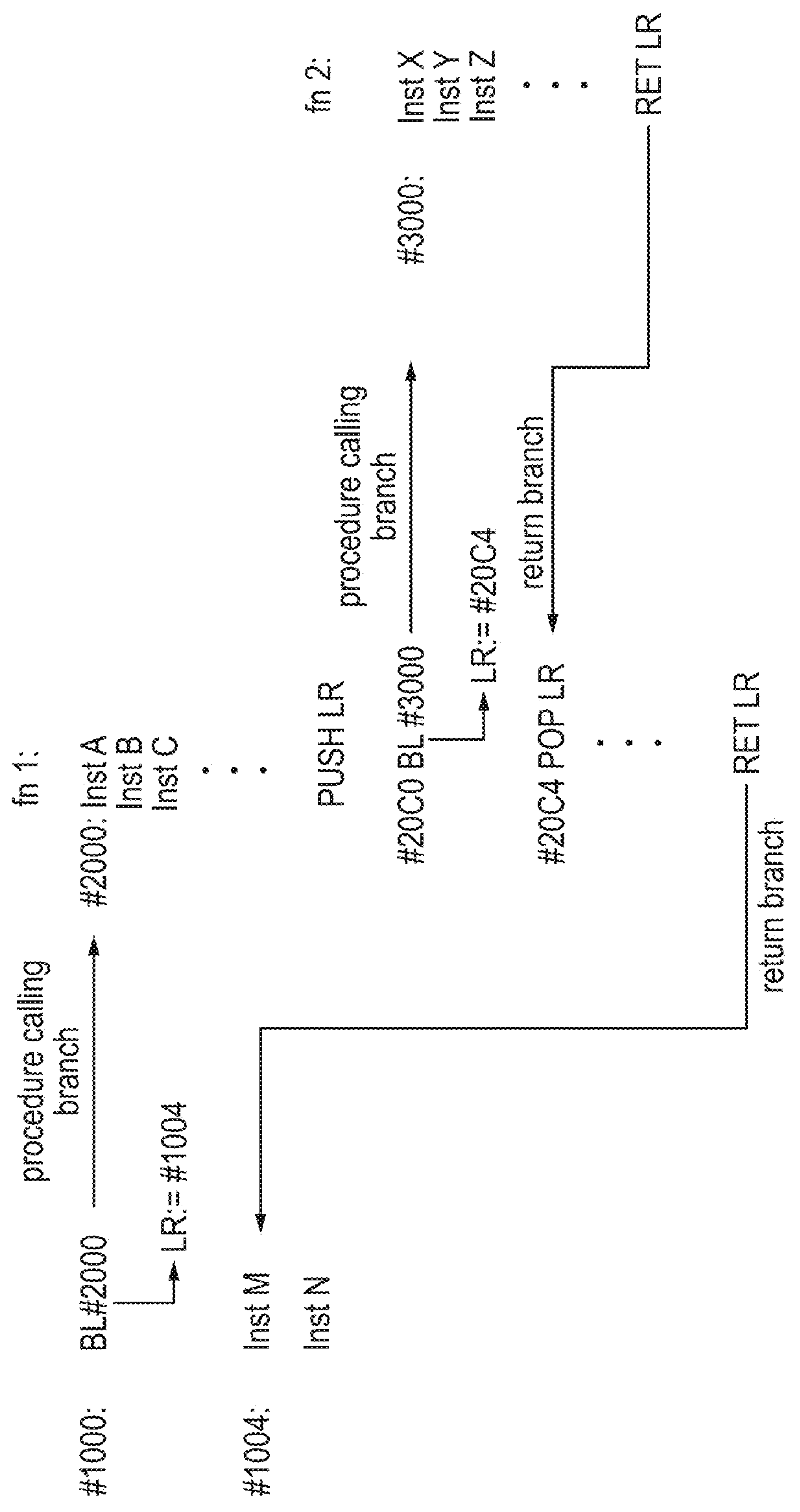
FIG. 2 illustrates nested procedure calls.

As discussed further below, the control stack accessed via the control stack pointer in register 18 (as a separate mechanism from any stack accesses based on the stack pointer 14) enables greater protection to be provided against return oriented programming attacks. FIG. 2 illustrates an example scenario where such attacks may be possible.

FIG. 2 illustrates an example of nested procedure calls, in which program code makes a first procedure call to function fn1, and then from within function fn1, a second procedure call to function fn2 is made.

For the first procedure call, a procedure calling branch instruction (BL, or branch-with-link instruction) is executed at instruction address #1000, to cause a branch to a branch target address #2000 representing the address of the first instruction, Inst A, to be executed within fn1. In addition to taking the branch, the procedure calling branch instruction also causes the address #1004 of the next instruction, InstM, appearing sequentially in memory after the procedure calling branch instruction itself to be saved to the link register 15 as a return address, ready for when the corresponding procedure return is made after completing fn1. By saving a return address, the same function can be called from many different locations within the program code being executed, as the link register retains the information about the location to which program flow should return after completing the function. After branching to Inst A at address #2000, program flow then continues with subsequent instructions B, C within fn1.

Before a further procedure call is made from within fn1, the code for fn1 includes a stack push instruction, PUSH, to push the return address #1004 from the link register 15 to a software-managed stack structure in memory at an address determined based on the stack pointer in stack pointer register 14. The stack pointer is advanced to point to the next stack entry, so that the stack can be managed as a last-in-first-out structure. By saving the return address to memory, a subsequent procedure calling branch instruction can overwrite the link register 15 without losing the return address associated with fn1. It is the responsibility of the software developer or compiler generating the code for fn1 to include an instruction for saving the link register contents to memory before calling another procedure. Having saved the return address to memory, the fn1 code can execute another procedure calling branch instruction (at address #20C0) which calls fn2 by branching to a target address #3000 of instruction X at the start of the fn2 code, and also writes the return address #20C4 for fn2 to the link register (that return address being the address of the instruction to which program flow should return after completing fn2).

Once the instructions X, Y, Z, etc. in fn2 are complete (in this example with no further procedure calls made from fn2), a procedure return branch instruction (RET) is executed which causes a branch to the return address obtained from the link register 15, which in this example is #20C4, causing program flow to revert to the fn1 code. The fn1 code executes a stack pop instruction, POP, which loads from the software-managed stack the previously saved return address #1004 that was saved to memory prior to calling fn2, and updates stack pointer 14 to point to the next youngest entry on the software-managed stack. The fn1 code then continues, until eventually completing and executing another procedure return branch instruction (RET) which causes program flow to revert to instruction #1004—i.e. instruction M located in memory just after the procedure calling branch instruction BL which called fn1.

While return addresses are stored out in memory, having been saved to memory due to the nesting of procedure calls as shown in FIG. 2, they can be vulnerable to tampering by an attacker or accidental modification due to coding errors, risking the return address that is loaded by the POP instruction in FIG. 2 being different from the return address previously saved to memory by the PUSH instruction. This can risk the RET instruction at the end of fn1 branching to the wrong instruction, causing execution of incorrect instructions (possibly a malicious gadget designed by an attacker to compromise secret information). Attacks based on corrupting return state used to control procedure returns (and other similar control flow altering attacks) may be referred to as return oriented programming (ROP) attacks, and can have serious consequences if successful, so it can be desirable to provide an architectural countermeasure against such attacks.

The apparatus 2 may have architectural measures for protecting against ROP attacks using a protected data structure in memory called a control stack (also known as guarded control stack (GCS), shadow stack, or return address protection stack). The location of the control stack data structure within the memory address space may be selected by software, but the hardware provides architectural features designed to protect the control stack data structure against tampering by a malicious attacker.

The registers 12 include one or more control stack pointer registers 18 for storing a stack pointer indicating an address on the control stack data structure. In some examples, the control stack pointer registers may comprise a banked set of registers, provided separately for at least two execution states (e.g. exception levels), to enable software operating at different execution states to reference different control stack structures within memory without needing to reprogram a shared control stack pointer register after each transition of execution state. Other examples could use a single control stack pointer register and software could update the control stack pointer stored in the control stack pointer register on a transition between execution states.

The control stack data structure pointed to using the control stack pointer is stored in a region of memory designated as being a control stack region of memory by a memory attribute specified, either directly or indirectly, by memory access permissions enforced by the memory access permission checking circuitry 10. For example, where the memory access permissions checking circuitry 10 comprises a memory management unit (MMU) which checks permissions defined by page tables, the page table entry corresponding to an address region allocated by software for storing the control stack may be set to specify a control stack region attribute that marks this region as being allowed to be accessed using instructions designated for the control stack load/store operations that are intended to access the control stack. The control stack region attribute could be specified directly within the encoding of the corresponding page table entry for a memory region comprising at least part of the control stack data structure, or could be referenced indirectly within a register referenced by that page table entry.

When a memory address region is identified as being of the control stack region type, then write access to that region is restricted to write requests triggered by the processing circuitry 6 when executing a certain subset of control-stack-accessing instructions. General purpose store instructions used by software for general store operations not intended to access the control stack structure are not considered one of the restricted subset of control-stack-accessing instructions. Hence, when a memory access request is requesting access to a control stack region, the request is a write (store) request, and the request is not a control stack memory access request triggered by one of the restricted subset of control stack-accessing instructions, then the memory access request is rejected and the fault is signalled. In some examples, the memory access permissions checking circuitry 10 may still permit the control stack structure to be read using a general purpose load instruction which causes issuing of a load access request which is not a control stack load access request, or alternatively general purpose loads to the control stack region type may also be prohibited.

The subset of control-stack-accessing instructions allowed to write to the control stack may include at least a control stack push instruction which causes information (such as the return address of a procedure call or other return state information) to be pushed to a location on the control stack structure determined using the control stack pointer indicated in the CSPR 18. The control stack push instruction also causes the control stack pointer to be advanced by an amount depending on the size of the stack frame pushed to the control stack (e.g. by incrementing the control stack pointer by the size of the stack frame if the control stack is managed as an ascending stack, or by decrementing the control stack pointer by the size of the stack frame if the control stack is managed as a descending stack). In some examples, the control stack push instruction could be a standalone push instruction, separate from the procedure calling branch instruction BL shown in FIG. 2. In other examples, the control stack push instruction could be a procedure calling branch instruction BL which is executed in a control stack enabled mode (when the control stack enabled mode is indicated as enabled based on the CSEn 16 control defined in a control register).

The subset of control-stack-accessing instructions may also include at least one form of control stack pop instruction which pops data (e.g. protected return information) from the control stack structure. As well as returning the return information popped from the stack, a control stack pop instruction also causes the control stack pointer in CSPR 18 to be adjusted in the opposite direction to the direction in which the control stack pointer is adjusted for a control stack push instruction (e.g. by decrementing the control stack pointer by the size of the stack frame if the control stack is managed as an ascending stack, or by incrementing the control stack pointer by the size of the stack frame if the control stack is managed as a descending stack). In some examples, the control stack push instruction could be a standalone push instruction, separate from the procedure return branch instruction RET shown in FIG. 2. In other examples, the control stack push instruction could be a procedure return branch instruction RET which is executed in the control stack enabled mode (when the control stack enabled mode is indicated as enabled based on the CSEn 16 control defined in a control register).

The control-stack-accessing instructions may not be allowed to access memory regions which are not designated by the memory access permissions as the control stack region type. Hence, a fault can be signalled if an attempt to perform a control stack load/store access is made when the memory region targeted by the access is not identified as the control stack region type. By prohibiting use of control-stack-accessing instructions for accessing non-control-stack regions, this discourages programmers from using the control-stack-accessing instructions unless it is really intended to be a control stack access, to reduce the attack surface available to an attacker. Also, this gives confidence that the load target data accessed by a control stack pop instruction is not able to be modified by non-control-stack store instructions.

The control stack structure is separate from the software-maintained data structure used by the software to maintain saved return state information within memory to handle nesting of function calls (which is accessed using the PUSH and POP instructions shown in FIG. 2 which compute their target addresses using the stack pointer in stack pointer register 14 rather than using the control stack pointer in control stack pointer register 18). Hence, the control stack structure is not intended to eliminate the need for software itself to track saving and restoring of return state information when function calls are nested (the software-triggered saving of return state may continue as shown in FIG. 2 in the same way as on a processor not supporting the control stack architectural measures discussed above). Instead, the control stack structure provides a region of protected memory which is protected against tampering by compromised program code, which can be used to provide information for verifying the return state information intended to be used by the software to return from processing of the function call or an exception.

In some implementations the control stack pop instruction, which causes protected return information to be popped from the control stack structure, may also cause the processing circuitry 6 to compare the popped return state with current return state information stored in registers (e.g. compare a loaded return address with the address in the link register 15), and to signal an exception (fault) if there is a mismatch between the return state information popped from the control stack structure and the intended return state information which software intends to use for a function return. Hence, software can be protected against tampering by including instances of the control stack push and pop instructions within the program code to be executed around a function call/return (or by activating the control stack enabled mode using CSEn 16, to cause existing procedure calling/return branches BL/RET to behave as the control stack push/pop instruction). Other implementations may define a separate instruction for verifying whether the intended return state information is valid, separate from the instruction which pops return state information from the control stack structure.

Figure 3:
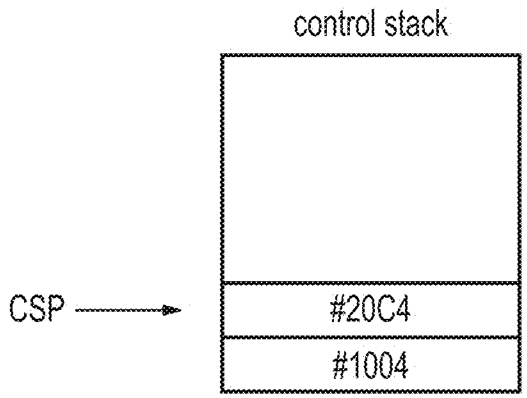
FIG. 3 illustrates an example of a control stack data structure.

In general, by providing architectural support for defining a control stack memory region type for use for the control stack structure, and restricting write access to the control stack region type to a limited subset of control-stack-accessing instructions (which may not be allowed to access memory regions other than the control stack region type), this reduces the attack surface available for an attacker to try to tamper with protected return state information stored on the control stack structure. Hence, when used to protect against ROP attacks for the example of nested procedure calls shown in FIG. 2, as shown in FIG. 3 the BL instructions (or a separate control stack push instruction if implemented separately from the BL instructions) may cause the return addresses #1004, #20C4 of functions fn1, fn2 to be saved to locations on the control stack identified based on the control stack pointer (CSP) in CSPR 18. Either the RET instructions for fn2 and fn2 respectively, or separate control stack pop instructions inserted into the program code just before those RET instructions, may cause the entries of the control stack to be popped in the opposite order from the order in which the entries were saved, so that the return addresses #20C4, #1004 can be loaded back in. The architectural protections described above mean that the return addresses on the control stack are less vulnerable to tampering by an attacker than the return addresses saved by software to a general purpose stack accessed via the stack pointer register 14.

Hence, control stack accessing instructions, such as the control stack push/pop instructions described above, are an example of instructions which introduce additional memory read/write operations as part of each procedure call/return that would not be required in the absence of support for the control stack. As procedure call/return operations are frequently occurring operations in program code, this can consume a lot of additional load/store bandwidth which, at least for the load operations, may have an impact on processing performance as control stack load operations may use up slots in the load/store unit 8 that may prevent other non-control-stack load operations being processed as early, and cause additional delays to dependent instructions.

It is recognised that the LIFO relationship between control stack push/pop operations mean that it is possible to track, using a hardware structure called the control stack information tracking circuitry 22 (shown in FIG. 1), items of information indicative of stack entries pushed to the control stack in memory by control stack push instructions, so that on corresponding control stack pop instructions, the load target data that would otherwise be read from memory in response to the control stack pop instruction can be determined based on the control stack information tracking circuitry 22. This allows control stack load elimination circuitry 20 to cause the control stack load operation corresponding to the control stack pop instruction to be eliminated to save memory bandwidth. This can be done without requiring a confirmation load to be performed later to check whether the data on the control stack in memory actually matches the information tracked by the control stack information circuitry 22. This can save a significant amount of load system bandwidth in an apparatus 2 supporting the control stack feature, to improve processing performance.

Various flow charts are now described. It will be appreciated that these flow charts show examples of a sequence of steps in a particular order, but the same functionality could be implemented by performing the steps in a different order or at least partially in parallel.

Figure 4A:
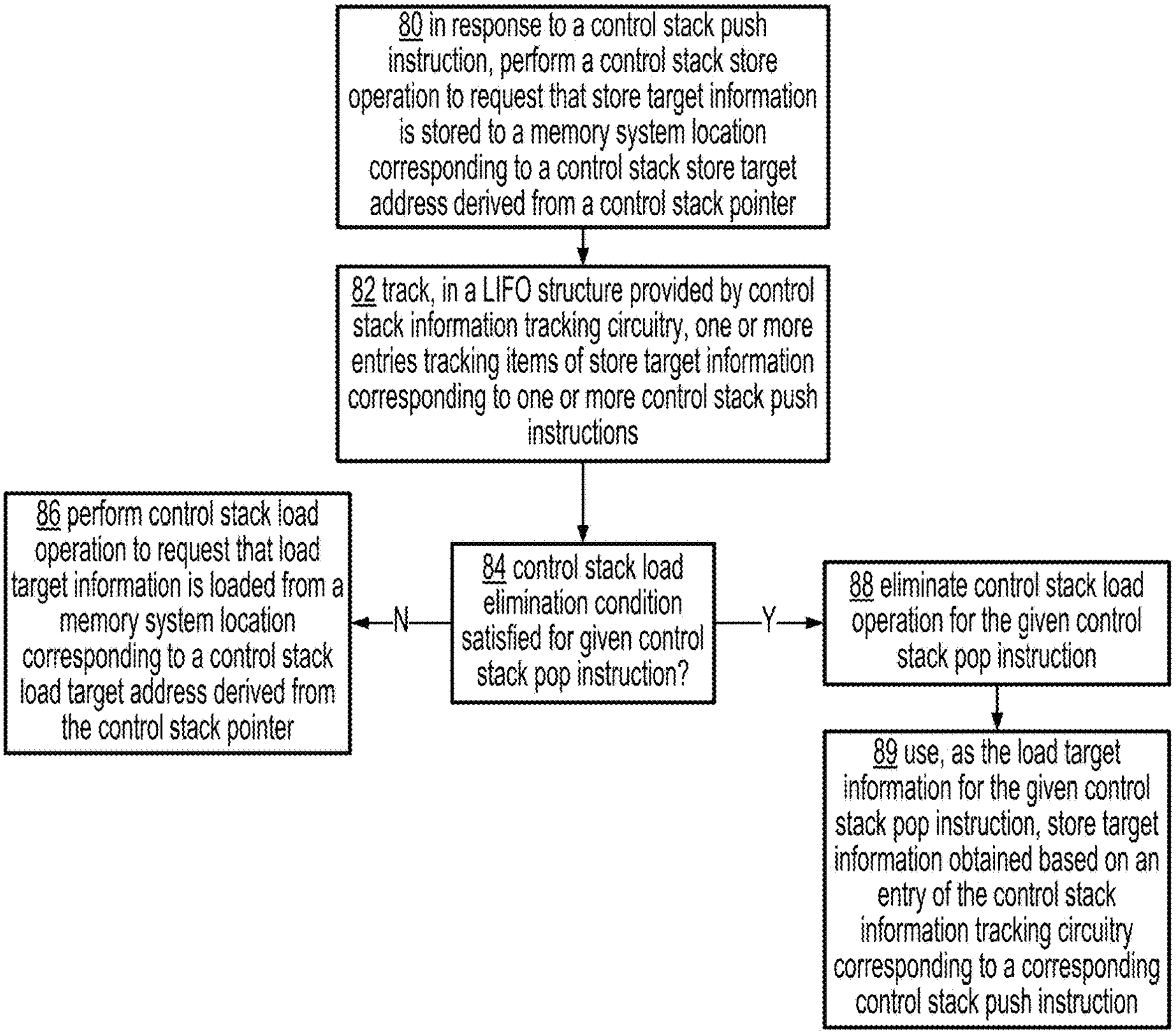
FIG. 4A illustrates an example method for elimination of a control stack load operation in response to a control stack pop instruction.

FIG. 4A is a flow chart showing a method for control stack load elimination. At step 80, in response to control stack push instruction, the processing circuitry 6 performs a control stack store operation to request that store target information is stored to a memory system location corresponding to a control stack store target address derived from the control stack pointer 18. Also, at step 82, the control stack information tracking circuitry 22 tracks, in a last-in-first-out (LIFO) structure maintained in hardware (separate from the memory system), one or more entries tracking items of store target information corresponding to one or more control stack push instructions. For example, the store target information pushed by the control stack push instruction at step 80 may be written to one of the entries of the control stack information tracking circuitry. Alternatively, tracking information that would allow the store target information to be identified (e.g. a physical register identifier of a physical register 12 holding the store target information) may be written to an entry of the control stack information tracking circuitry 22. Hence, it is not essential that the tracking information representing the store target information actually specifies the store target information itself.

At step 84, in response to encountering a given control stack pop instruction, the control stack load elimination circuitry 20 determines whether a control stack load elimination condition is satisfied for the given control stack pop instruction. If the condition is not satisfied, then at step 86, the control stack load elimination circuitry 20 does not eliminate the control stack load operation corresponding to the given control stack pop instruction, and the processing circuitry 6 is controlled to perform the control stack load operation to request that load target information is loaded from a memory system location corresponding to a control stack load target address derived from the control stack pointer 18.

If the control stack load elimination condition is satisfied, then at step 88 the control stack load operation for the given control stack pop instruction is eliminated by the control stack load elimination circuitry 20, and at step 89 the control stack load elimination circuitry 20 controls the processing circuitry 6 to use, as the load target information for the given control stack pop instruction, store target information obtained based on an entry of the control stack information tracking circuitry 22 which corresponds to a corresponding control stack push instruction. By eliminating the control stack load operation from needing to be processed by the load/store unit 8, this conserves load processing bandwidth for other operations not related to the control stack, and so improves performance.

Figure 4B:
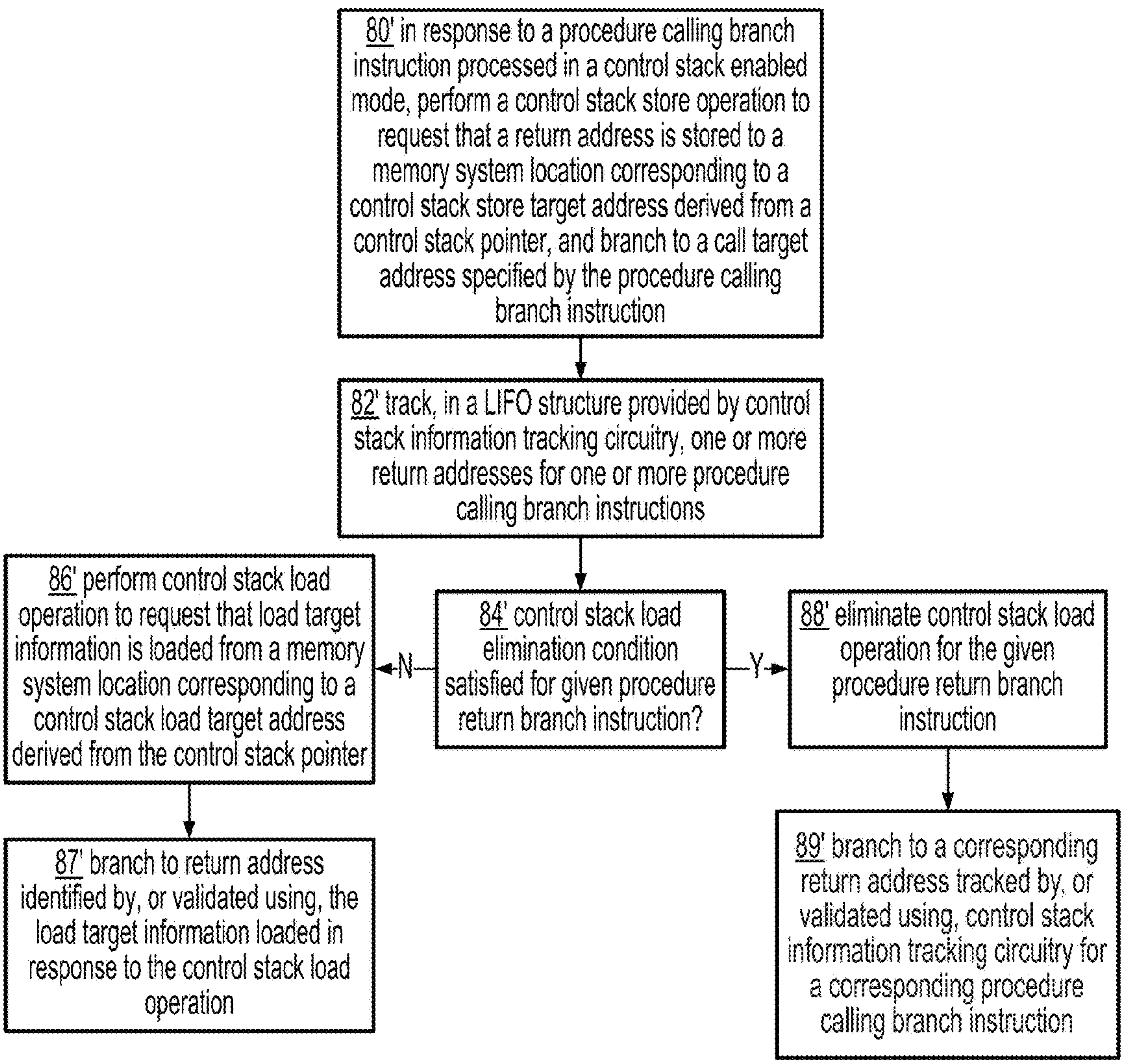
FIG. 4B illustrates a more specific example of the method of FIG. 4A, where the control stack pop instruction is a procedure return branch instruction processed in a control stack enabled mode.

FIG. 4B shows a more specific example of method of FIG. 4A, for the specific case where the control stack push instruction is a procedure calling branch instruction processed in a control stack enabled mode and the control stack pop instruction is a procedure return branch instruction processed in the control stack enabled mode (the control stack enabled mode either being enabled by default when the control stack enabled mode is active, for an implementation not supporting the control stack enable control 16, or being considered enabled when the control stack enable control 16 is set to indicate that the mode is enabled).

At step 80', in response to a procedure calling branch instruction processed in the control stack enabled mode, the processing circuitry 6 performs the control stack store operation as at step 80 of FIG. 4A. For the procedure calling branch instruction, the store target information written to memory comprises a return address for the procedure call initiated by the procedure calling branch instruction. That return address is computed by adding an offset corresponding to the instruction width of the procedure calling branch instruction to the address of the procedure calling branch instruction. Also, a branch is executed to cause program flow to branch to a call target address specified by the procedure calling branch instruction. At step 82', the return address (or information indicating a location of the return address, e.g. a physical register identifier of a physical register currently mapped to the link register 15) is also written to the LIFO structure tracked by the control stack information tracking circuitry 22, which maintains the LIFO structure to track one or more return addresses for corresponding procedure calling branch instructions. As discussed with respect to FIGS. 9 and 13 below, the control stack information tracking circuitry 22 could be a LIFO structure maintained at a rename stage of a processing pipeline, or could be a call-return stack used by a branch predictor to predict return addresses for procedure return branch instructions, for example.

At step 84', in response to a given procedure return branch instruction, the control stack load elimination circuitry 20 determines whether a control stack load elimination condition is satisfied for the given procedure return branch instruction. If the condition is not satisfied, then at step 86', the control stack load elimination circuitry 20 does not eliminate the control stack load operation corresponding to the given procedure return branch instruction, and the processing circuitry 6 is controlled to perform the control stack load operation to request that load target information (expected to include a return address) is loaded from a memory system location corresponding to a control stack load target address derived from the control stack pointer 18. At step 87', the processing circuitry 6 branches to a return address identified by, or validated using, the load target information loaded in response to control stack load operation.

If the control stack load elimination condition is satisfied, then at step 88' the control stack load operation for the given procedure return branch instruction is eliminated by the control stack load elimination circuitry 20, and at step 89' the control stack load elimination circuitry 20 controls the processing circuitry 6 to branch to an instruction at a corresponding return address tracked by, or validated using, the control stack information tracking circuitry 22 for a corresponding procedure calling branch instruction.

Figure 5:
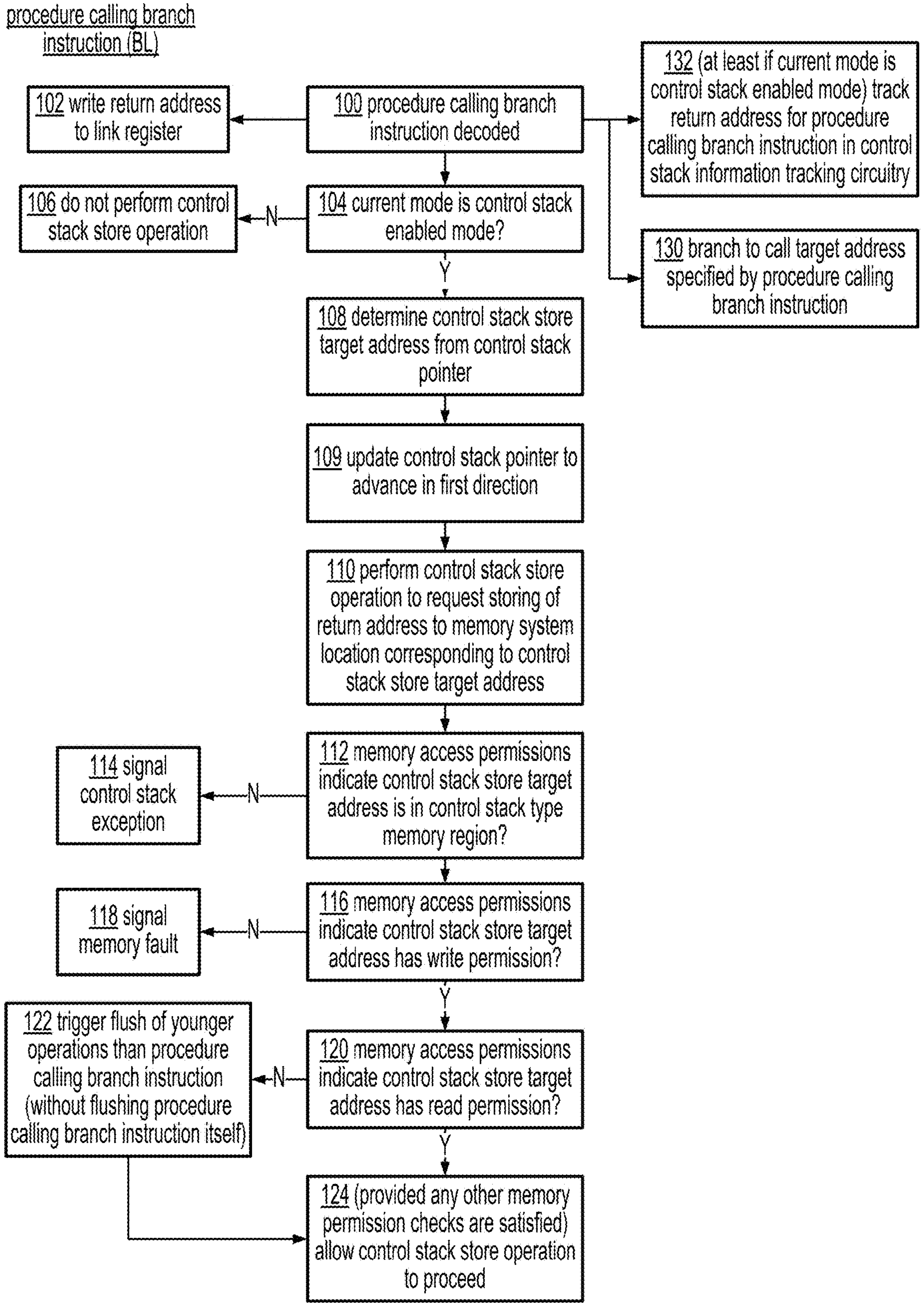
FIG. 5 illustrates steps for processing a procedure calling branch instruction processed in a control stack enabled mode.

FIG. 5 shows in more detail an example of steps performed in response to a procedure calling branch instruction (BL). At step 100 the procedure calling branch instruction is decoded by the front end circuitry 4, and the front end circuitry controls the processing circuitry 6 to, at step 102, compute a return address (by adding an offset corresponding to the instruction width of the procedure calling branch instruction to the address of the procedure calling branch instruction) and write the return address to the link register 15. Also, at step 130, the processing circuitry 6 branches to a call target address specified based on at least one operand of the procedure calling branch instruction. At least if the current mode is the control stack enabled mode, at step 132 the control stack information tracking circuitry 22 also writes information indicative of the return address to its LIFO tracking structure. In some examples, step 132 may be omitted if the current mode is a control stack disabled mode (as indicated by CSEn 16).

Whether the procedure calling branch instruction causes a control stack store operation to be performed depends on whether the current mode is the control stack enabled mode. If the current mode is a control stack disabled mode, then at step 106 the control stack store operation is not performed. Hence, the front end circuitry 4 does not issue a store micro-operation to the processing circuitry 6 in response to the procedure calling branch instruction.

If the current mode is the control stack enabled mode, then a store micro-operation is issued to the processing circuitry. At step 108 the processing circuitry 6 determines a control stack store target address from the control stack pointer stored in the CSPR 18. At step 109 the control stack pointer is updated to advance in a first direction (e.g. incremented, by an amount corresponding to the size of one stack frame containing the return address). At step 110, the load/store unit 8 of the processing circuitry 6 is requested to perform the control stack store operation which requests that the return address computed for the procedure calling branch instruction at step 102 is written to a memory system location corresponding to the control stack store target address determined at step 108.

At steps 112, 116, 120, the memory access permission checking circuitry checks memory access permissions associated with the control stack store target address, to determine whether the control stack store operation can be allowed. The memory access permissions could be defined in MPU registers, or in translation table structures obtained from the memory system (information from which can be cached in a translation lookaside buffer, TLB, maintained by the memory access permissions checking circuitry 10). The memory access permissions checks are shown sequentially in FIG. 5 but could be performed in parallel or in a different order in other examples.

At step 112, the memory access permission checking circuitry 10 determines whether the memory access permissions indicate that the control stack store target address is in the control stack type memory region. If the control stack store target address is not in the control stack type of memory region, then at step 114 a control stack exception is signalled to the front end circuitry 4 and processing circuitry 6, which will interrupt processing and cause the processing circuitry 6 to switch to processing an exception handler. The control stack store operation associated with the procedure calling branch instruction is not successful, so the return address is not written to memory.

At step 116, the memory access permission checking circuitry 10 determines whether the memory access permissions indicate that the control stack store target address has write permission. If not, then at step 118 a memory fault is signalled because a store (write) to a read-only region of memory should not be permitted. The memory fault may cause processing to be interrupted (without allowing the control stack store operation to cause a write to memory), to allow an exception handler to determine how to handle the memory fault.

At step 120, the memory access permission checking circuitry 10 determines whether the memory access permissions indicate that the control stack store target address has read permission. This check may seem counter-intuitive, as normally read permission would not be needed for store operations. However, the read permission is checked at the time of processing the control stack store operation because there is a risk that a subsequent control stack load operation to the same address (which would require read permission to be allowed) could be eliminated by the control stack load elimination circuitry 20 so that there would be no load micro-operation processed by the processing circuitry 6 that could act as a trigger to cause the memory access permission checking circuitry 10 to check for read permission. Therefore, the read permission is checked at the time of processing a corresponding control stack store operation. Hence, if the control stack store target address does not have read permission, then at step 122 the memory access permission checking circuitry 10 triggers a flush event to cause younger operations than the procedure calling branch instruction to be flushed from the processing pipeline implemented by the front end circuitry 4 and processing circuitry 6, without flushing the procedure calling branch instruction itself. The flush event triggered at step 122 acts as a control stack load elimination clearing event (discussed further with respect to FIG. 7 below), so will cause the control stack information tracking circuitry 22 to clear information used to determine whether control stack load operations can be eliminated, so that the control stack load elimination condition will be determined not to be satisfied for a subsequent procedure return branch instruction that corresponds to the level of nesting of the current procedure calling branch instruction. This ensures that when the corresponding procedure return branch instruction is encountered, its control stack load operation will not be eliminated, so that a load micro-operation will be issued to the load/store unit 8 and can trigger the memory access permissions checking circuitry 10 to identify that there is no read permission and signal a corresponding memory fault. At step 122 performed in response to the procedure calling branch instruction, there is no need to flush the procedure calling branch instruction, or signal a memory fault, because the procedure calling branch instruction does not require read permission and so the control stack store operation can proceed even when the flush of younger operations is triggered at step 122. The purpose of the flush is to ensure that a subsequent procedure return branch instruction is processed correctly (by loading its control stack data from the control stack), so there is no error associated with the procedure calling branch instruction.

If the memory access permissions checked at step 120 had indicated that the control stack store target address is associated with read permission, then step 122 is omitted.

Regardless of whether or not read permission is provided for the control stack store target address, at step 124 the control stack store operation can proceed provided any other required permissions checks performed by the memory access permission checking circuitry 10 are satisfied.

Figure 6:
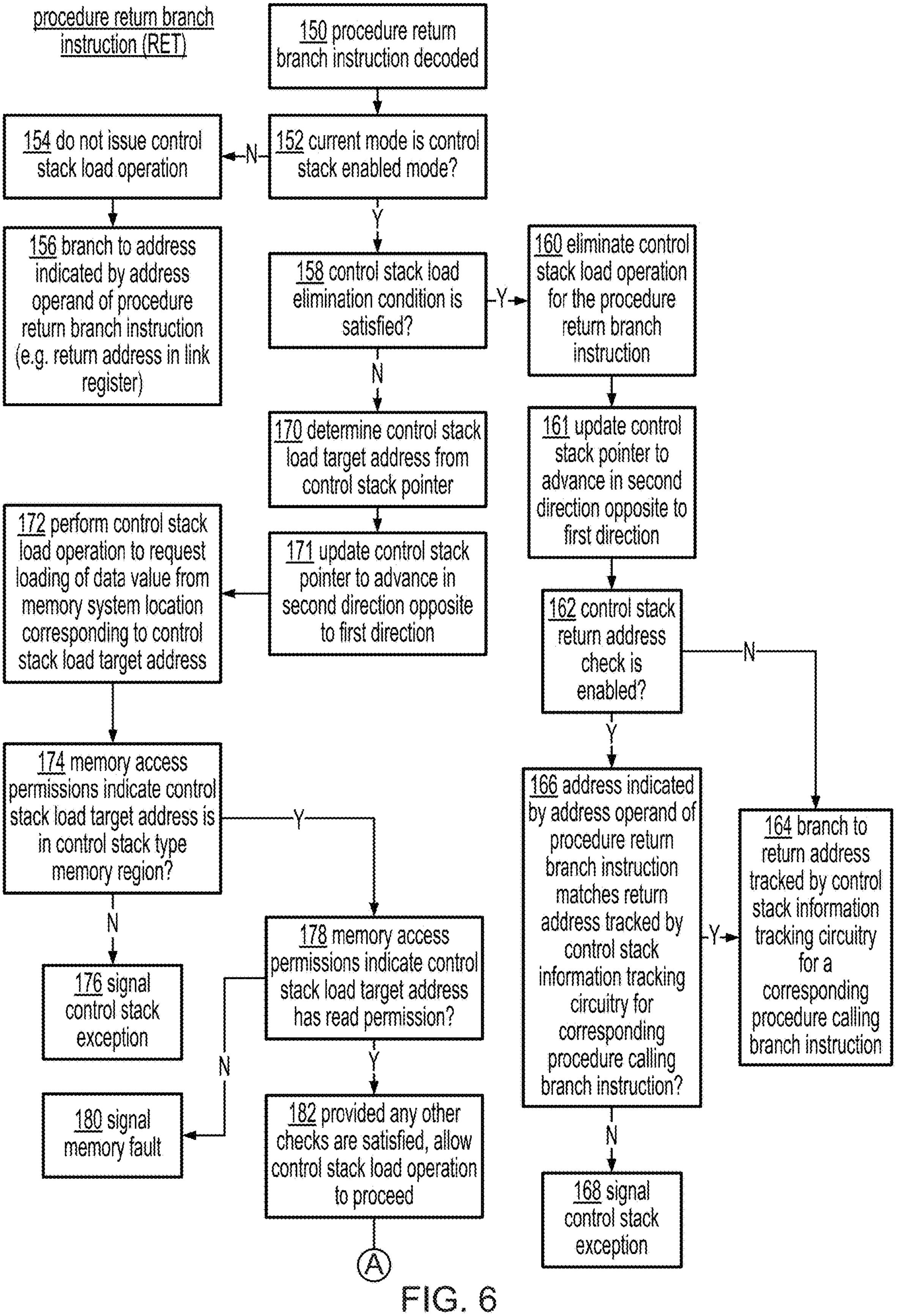
FIG. 6 illustrates steps for processing a procedure return branch instruction processed in a control stack enabled mode.
Figure 6:
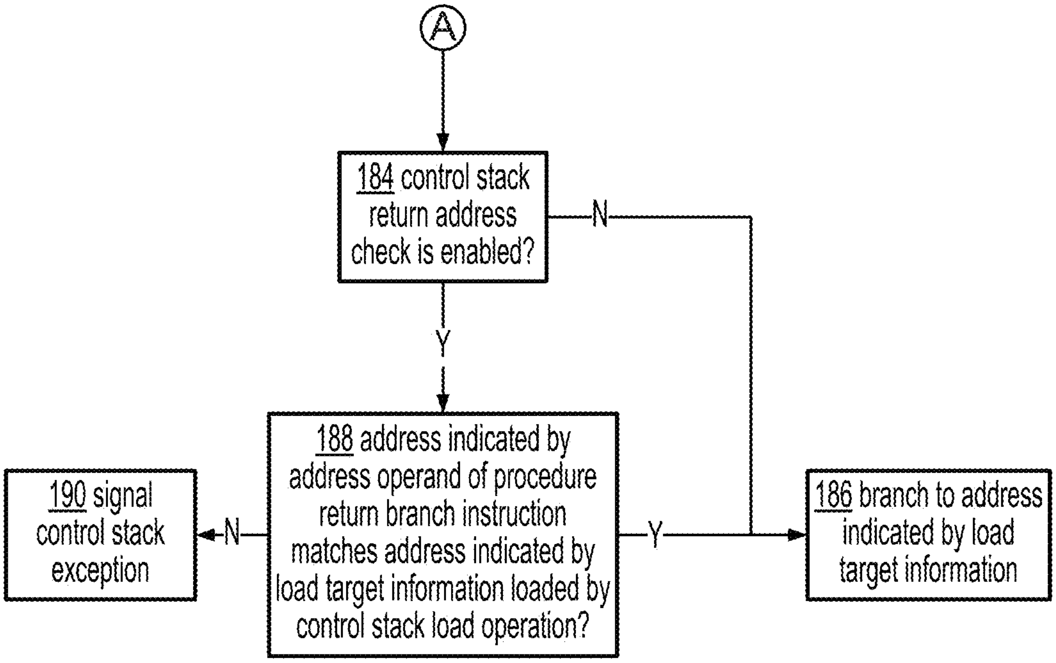

FIG. 6 illustrates steps performed in response to a procedure return branch instruction (RET). At step 150, the front end circuitry 4 decodes the procedure return branch instruction. At step 152 the front end circuitry determines whether the current mode is the control stack enabled mode, and if not, then at step 154 determines that no control stack load operation is needed, and at step 156 controls the processing circuitry 6 to branch to an address indicated by an address operand of the procedure return branch instruction. For procedure return branch instructions, that address operand will typically be the return address indicated in the link register 15, although the procedure return branch instruction may have an instruction encoding that can also define its address operand using other registers.

If the current mode is the control stack enabled mode, then at step 158 the control stack load elimination circuitry 20 determines whether the control stack load elimination condition is satisfied. The control stack load elimination condition can be evaluated based on at least one control stack load elimination tracking indication, which tracks whether, since a procedure calling branch instruction caused a return address to be tracked using the LIFO tracking structure maintained by the control stack information tracking circuitry 22, any intervening control stack load elimination clearing event has been detected at an intervening point of program flow between that procedure calling branch instruction and the current procedure return branch instruction.

If the tracking indication maintained by the control stack load elimination circuitry 20 indicates that the control stack load elimination condition is satisfied (i.e. no intervening control stack load elimination clearing event has occurred), then at step 160 the control stack load elimination circuitry 20 eliminates the control stack load operation for the procedure return branch instruction (so no load micro-operation is issued in response to the RET instruction). A branch micro-operation is issued to the processing circuitry 6 to control performing a branch operation in response to the procedure return branch instruction, and if enabled, performing a control stack return address check.

At step 161, even though the control stack load operation can be eliminated, the control stack pointer in CSPR 18 is updated to advance in a second direction opposite to the first direction in which the control stack pointer is advanced at step 109 for a procedure calling branch instruction. That is, the same update to the control stack pointer is made that would be performed at step 171 in cases where the control stack load operation is performed. The control stack pointer may for example be incremented or decremented by an amount corresponding to the size of a return address stack frame. This ensures that, even when the control stack load operation is eliminated, the control stack pointer is maintained as if the control stack load was performed, so that a subsequent control stack accessing instruction will access the correct entry on the stack (e.g. a following RET instruction unwinding the next outer function call of a nested set of functions should read the next oldest entry of the control stack after the entry that would have been accessed by the control stack load operation had it not been eliminated).

At step 162, the processing circuitry 6 determines whether the control stack return address check is enabled. In some examples, control stack return address checks may be implicitly enabled for each instance of a procedure return branch instruction executed in the control stack enabled mode. Other examples may support a control parameter (similar to the CSEn parameter 16) which can be written by software to control whether the control stack return address check is enabled. If the control stack return address check is disabled, then at step 164, the processing circuitry branches to a return address tracked by the control stack information tracking circuitry 22 for a corresponding procedure calling branch instruction. If the control stack return address check is enabled, then at step 166 the processing circuitry 6 performs a comparison to determine whether the address indicated by the address operand of the procedure return branch instruction matches the return address tracked by the control stack information tracking circuitry 22 for the corresponding procedure calling branch instruction. If the comparison identifies a match between the address identified by the address operand and the tracked return address from the control stack information tracking circuitry 22, then the branch to that address is performed at step 164. If the comparison identifies a mismatch between the address identified by the address operand and the tracked return address from the control stack information tracking circuitry 22, then at step 168 a control stack exception is signalled, to inform software that there is a risk of a possible ROP attack or software error which might cause incorrect program flow. The software exception handler executed in response to the control stack exception can decide how to handle the identified error. In some cases, the branch step 164 may already have been performed by the time the error is identified and the exception is signalled, so sometimes both steps 164 and 168 may be performed.

If at step 158 the processing circuitry 6 determines that control stack load elimination condition is not satisfied, then a control stack load operation cannot be eliminated for the procedure return branch instruction. At step 170, the processing circuitry 6 determines the control stack load target address based on the control stack pointer in CSPR 18, and at step 171 updates the control stack pointer to advance in a second direction opposite to the first direction (the same update to the control stack pointer as described above for step 161). At step 172, the processing circuitry 6 performs a control stack load operation to request loading of a data value (the load target information) from a memory system location corresponding to the control stack load target address.

Memory permissions checks are performed for the control stack load operation. These may include various checks not illustrated in FIG. 6, implemented for purposes unrelated to use of the control stack.

At step 174, the memory access permission checking circuitry 10 determines whether the memory access permissions indicate that the control stack load target address is in the control stack type memory region. If the control stack load target address is not in the control stack type of memory region, then at step 176 a control stack exception is signalled to the front end circuitry 4 and processing circuitry 6, which will interrupt processing and cause the processing circuitry 6 to switch to processing an exception handler. The control stack load operation associated with the procedure return branch instruction is not successful.

At step 178, the memory access permission checking circuitry 10 determines whether the memory access permissions indicate that the control stack load target address has read permission. If not, then at step 180 a memory fault is signalled because a read to a region of memory without read permission should not be permitted. The memory fault may cause processing to be interrupted (without the control stack load operation being successful), to allow an exception handler to determine how to handle the memory fault.

If the control stack load target address is in a control stack type memory region and has read permission, then provided any other memory access checks are satisfied, the memory access permission checking circuitry 10 allows the control stack load operation to proceed, and so a request is sent to the memory system to retrieve the load target information identified by the control stack load target address.

At step 184, the processing circuitry 6 determines whether the control stack return address check is enabled. If the check is disabled, then at step 186 the processing circuitry 6 performs a branch to the address indicated by the load target information. If the control stack return address check is enabled, then at step 188 the processing circuitry 6 compares the address indicated by the address operand of the procedure return branch instruction with a return address indicated by the load target information returned from memory in response to the control stack load operation. If the comparison identifies a match between the address identified by the address operand and the address indicated by the load target information, then at step 186 the processing circuitry 6 branches to that address. If the comparison identifies a mismatch between the address identified by the address operand and the returned load target information, then the mismatch indicates a possible risk of coding error or attack that could make the code vulnerable to subsequent incorrect sequences of program flow, and so at step 190 a control stack exception is signalled. Again, in some cases, branch step 186 may be performed before the outcome of the return address check is known, and then the exception for step 190 is triggered once the branch has already taken place.

Figure 7:
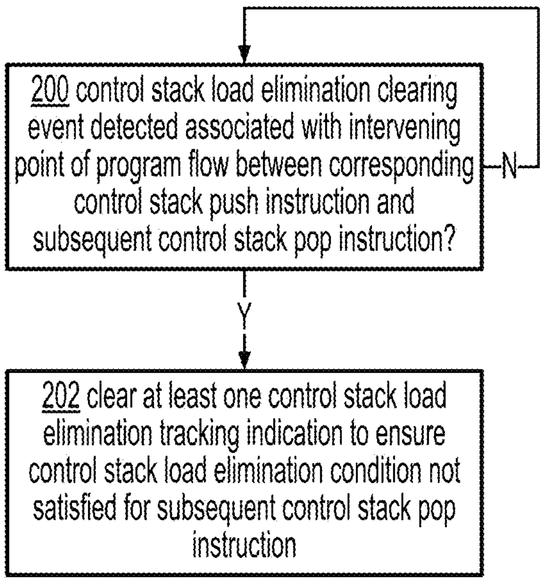
FIG. 7 illustrates handling of a control stack load elimination clearing event.

FIG. 7 illustrates steps for handling a control stack load elimination clearing event. At step 200, the control stack load elimination circuitry 20 detects whether a control stack load elimination clearing event has been detected associated with an intervening point of program flow between the corresponding control stack push instruction and a subsequent control stack pop instruction. If no control stack load elimination clearing event is detected, then there is no need to clear any control stack load elimination tracking indication used to detect whether the control stack load elimination condition evaluated at one of steps 84, 84', 158 is satisfied. If the control stack load elimination clearing event is detected, then at step 202 the control stack load elimination circuitry 20 clears at least one control stack load elimination tracking indication to ensure that the control stack load elimination condition will not be satisfied for a subsequent control stack pop instruction that is processed without another control stack push instruction being encountered between the point that the control stack load elimination tracking indication is cleared and the control stack pop instruction being encountered (if after clearing the control stack load elimination tracking indication, a control stack push instruction is encountered then this may cause the control stack load elimination tracking indication to be set again to permit control stack load elimination based on a tracking entry held by the control stack information tracking circuitry 22 to track the store target information pushed to the control stack by the control stack push instruction).

The control stack load elimination tracking indication that is cleared in response to the control stack load elimination clearing event could take various forms, depending on implementation. For example, the control stack load elimination tracking indication could be any of:

- entries of the LIFO structure maintained by the control stack information tracking circuitry 22, which may be invalidated in response to the control stack load elimination clearing event;
- a pointer or nesting counter used to point to the entry at the top of the LIFO structure (or to the next entry to be updated on the LIFO structure in response to a control stack push instruction), which can be reset (to indicate there are no valid entries on the LIFO structure) in response to the control stack load elimination clearing event;
- a flag or other indicator indicating whether the control stack load elimination condition can be considered satisfied, which can be cleared in response to the control stack load elimination clearing event;

Various types of control stack load elimination clearing event may be supported. For example, the control stack load elimination circuitry 20 could support one or more types of control stack load elimination clearing event, and so may cause step 202 to be performed to clear tracking indications if any of the supported types of control stack load elimination clearing event is detected at step 200. Supported control stack load elimination clearing event types could include any one or more of the following:

- a flush event associated with an intervening point of program flow between a corresponding control stack push instruction and control stack pop instruction, which causes instructions younger than the intervening point of program flow to be flushed from the pipeline. Possible causes of such a flush event can include a branch misprediction, or the flush triggered at step 122 of FIG. 5 when the control stack store target address for a control stack push instruction does not have read permission. This ensures that a subsequent control stack pop instruction does not have its load eliminated to ensure any read permissions can be enforced and the correct load target information is obtained from the control stack data structure in memory. It is possible in some implementations to restore tracking indications following a misprediction, to enable continued use of control stack load elimination after the misprediction.
- detection of a control stack store instruction (other than the control stack push instruction itself whose store target information is tracked and predicted based on the control stack information tracking circuitry 22). For example, other instruction types which may store to the control stack could include instructions to push exception return state to the control stack, or a non-pointer-advancing control store instruction which could be used to update data in a particular control stack data without advancing the control stack pointer. Such instruction types may risk the data on the control stack becoming different to the data tracked by the control stack information tracking circuitry 22, or the nested relation between control stack push/pop instructions becoming different from what is assumed by the LIFO tracking using the control stack information tracking circuitry 22, so it can be safest to treat such instructions as a control stack load elimination clearing event.
- an instruction which updates the stack pointer. Certain instruction types may be defined to allow control stack pointer updates to the CSPR 18. The ability to execute such instructions successfully may be reserved for a subset of more privileged execution states. If the control stack pointer is updated (e.g. on a context switch between threads), then the information previously tracked in the control stack information tracking circuitry 22 may not match the load target information that would be loaded when a subsequent control stack pop instruction is executed based on the new control stack pointer, so it is safest to clear the information used to cause control stack load operation elimination.
- a control stack synchronisation instruction which enforces a requirement to make the effects of older control stack store operations visible to younger non-control-stack load/store operations (or make effects of older non-control-stack store operations visible to younger control stack load/store operations). This could be an indication that instructions other than the tracked control stack push/pop instructions may be influencing the contents of the control stack, so that it cannot be guaranteed that information pushed to the control stack previously by a control stack push instruction will necessarily match corresponding information which would be popped from the control stack if a subsequent control stack pop instruction is executed. Again, the control stack synchronisation instruction can be treated as a control stack load elimination clearing event.
- Cache maintenance and/or translation lookaside buffer (TLB) invalidation instructions/commands. Such operations may be a mechanism for ensuring external visibility of memory updates carried out within the processor and/or signal that there have been changes in memory access permissions, so it may be unreliable to assume that any permissions/data tracked at the time of a previous control stack push instruction seen before the cache/TLB maintenance operation are still valid when a subsequent control stack pop instruction is encountered.
- Overflow of the LIFO tracking structure used by the control stack information tracking circuitry 22 to track information for control stack push/pop operations. If the number of nested procedure calls is greater than the maximum number of entries supported by the LIFO tracking structure, there may be a risk that eliminating control stack load operations would cause the wrong entry of the LIFO tracking structure to be used for the control stack pop operation, so it can be safest to clear tracking indications to ensure subsequent control stack pop operations encountered without another control stack push in the meantime are handled without eliminating the control stack load operation. Alternatively, following an overflow, the tracking indications may be retained, but a counter may be incremented for each control stack push operation detected since the overflow, with the counter decremented each time a subsequent control stack pop operation is detected, so that once the counter returns to an initial value (e.g. zero), it can be deduced that the information at the top of the stack once more becomes relevant for the next control stack pop operation and so control stack load elimination can be resumed.

It will be appreciated that these are just some examples of possible clearing events and other examples are also possible. However, in general, the nature of these events and the LIFO nested relation between control stack push/pop operations means that the prediction of load target information for a control stack pop based on information tracked at the time of a control stack push can be determined with certainty (assuming none of the intervening clearing event types has occurred), so that it is not necessary to verify this prediction using a confirmation load which reads the load target information for the control stack pop instruction from memory. This means significant load bandwidth savings can be made.

Figure 8:
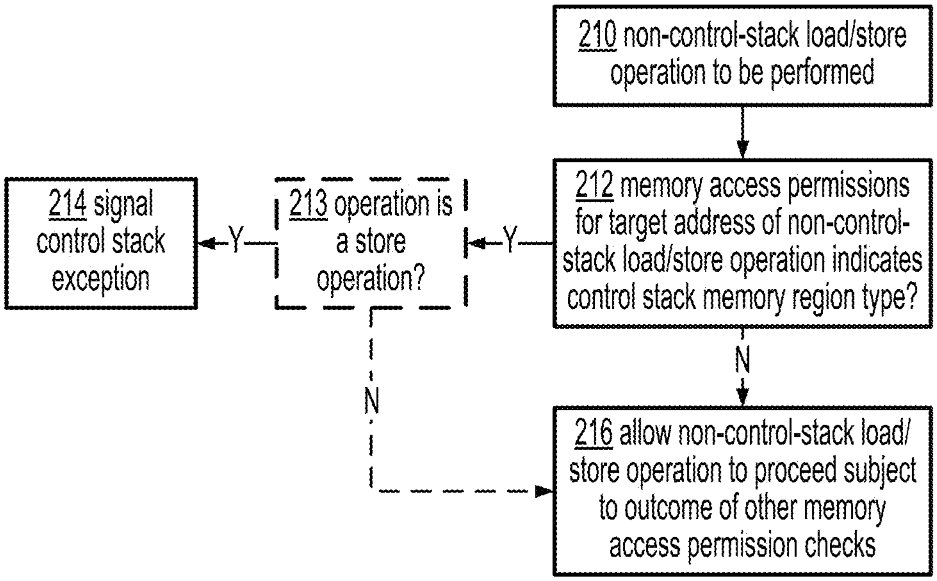
FIG. 8 illustrates steps for processing a non-control-stack load/store operation.

FIG. 8 illustrates handling of a non-control-stack load/store operation which is detected as to be performed at step 210. This is a load/store operation triggered by an instruction which is not one of the special class of instructions allowed to generate control stack load/store operations. In response, at step 212, the memory access permissions checking circuitry 10 determines whether the memory access permissions associated with the target address of the non-control-stack load/store operation indicate that the target address is in a region of the control stack memory region type.

For at least some examples, at step 213, the memory access permissions checking circuitry 10 determines whether the requested load/store operation is a store operation. If the operation is a store operation and the target address is in a region of the control stack memory region type then at step 214 a control stack exception is signalled, to prevent non-control-stack store operations modifying data on the control stack structure. This reduces the attack surface available to attackers seeking to compromise the control stack contents, since only control-stack-store types of instructions are allowed to write to the control stack, which will occur much less frequently than the majority of store operations in a program which are of the non-control-stack store instruction type.

Some implementations may also prevent non-control-stack load operations accessing the control stack memory region type, so in those implementations step 213 can be omitted and step 214 can be performed when a non-control-stack load/store operation seeks to access a memory region of the control stack memory region type, regardless of whether the operation is a load or store operation.

If the memory region type of the region associated with the target address is not of the control stack memory region type, or if step 213 is implemented and the operation requested is a load operation, then at step 216 the non-control-stack load/store operation can be allowed to proceed, subject to the outcome of other memory access permission checks (e.g. checks of read/write permissions or other restrictions indicated by the memory access permissions checks).

Some more specific implementations of the control stack load elimination circuitry 20 and control stack information tracking circuitry 22 are now described.

Figure 9:
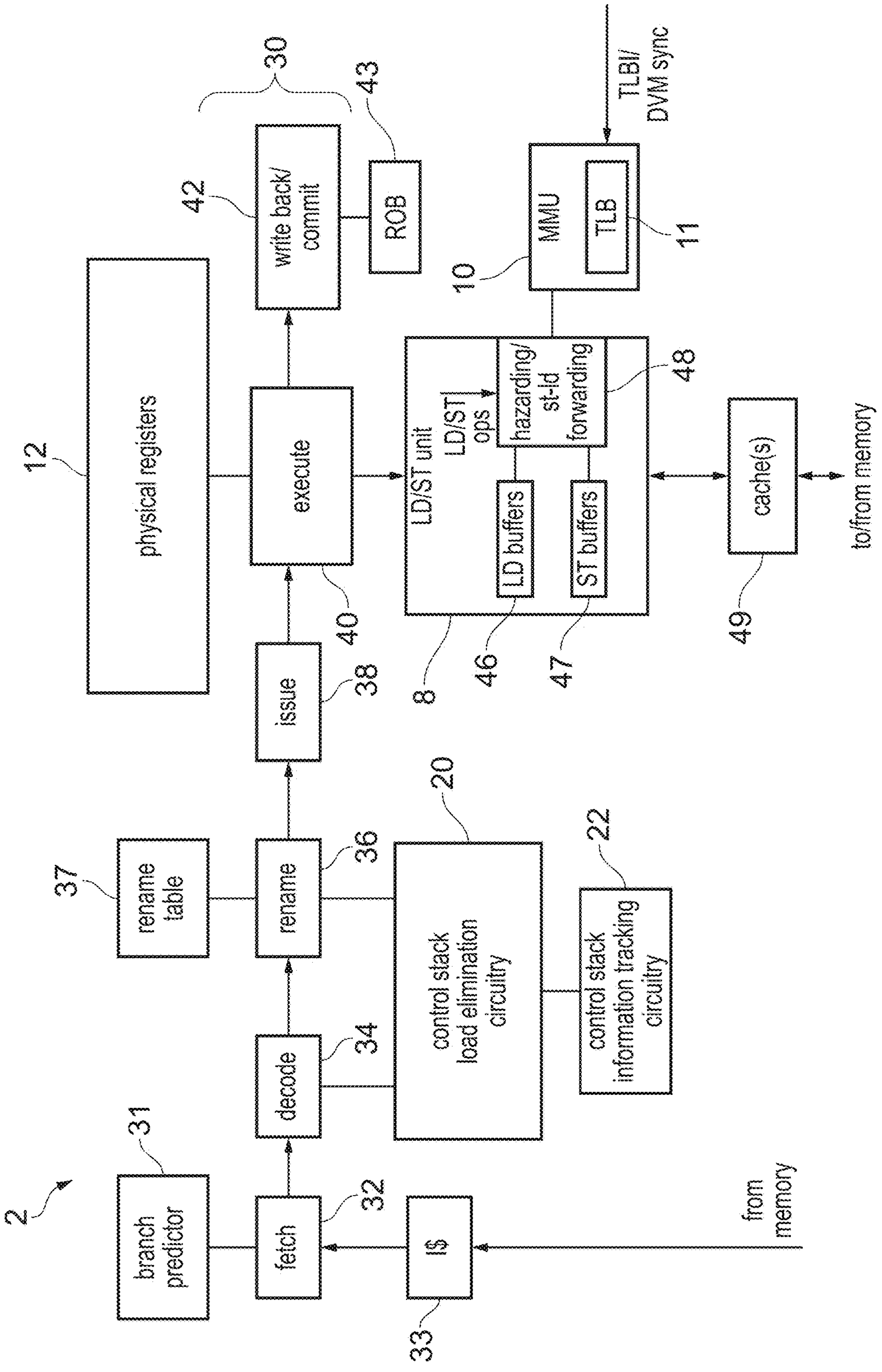
FIG. 9 illustrates a first example apparatus supporting control stack load elimination.

FIG. 9 shows a first example. FIG. 9 shows a more detailed view of components of a processing pipeline 30 corresponding to the front end circuitry 4 and processing circuitry 6 previously discussed with respect to FIG. 1. The processing pipeline 30 includes a number of pipeline stages, including some front end pipeline stages 32, 34, 36, 38 corresponding to the front end circuitry 4 and processing pipeline stages 40, 42 corresponding to the processing circuitry 6. In this example, the front end circuitry 4 includes a fetch stage 32 for fetching instructions from an instruction cache 33 or from memory (the sequence of fetch addresses can be determined based on branch predictions made by a branch predictor 31); a decode stage 34 for decoding the fetched program instructions to generate micro-operations (decoded instructions) to be processed by remaining stages of the pipeline; a register renaming stage 36 for mapping (with reference to a rename table 37) architectural registers specified by program instructions or micro-operations to physical register specifiers identifying physical registers in the register file 12; and an issue stage 38 for checking whether operands required for the micro-operations are available in the register file 12 and issuing micro-operations for execution once the required operands for a given micro-operation are available (or are guaranteed to have become available by the time the micro-operation reaches the stage at which the operands are needed). The processing circuitry 6 includes an execute stage 40 for executing data processing operations corresponding to the micro-operations by processing operands read from the register file 12 to generate result values or by executing load/store operations using the load/store unit 8; and a writeback/commit stage 42 for writing the results of the processing back to the register file 12 and for tracking commitment of instructions. In this example, the processor 2 is an out-of-order processor and so the writeback/commit stage 42 tracks, using a reorder buffer 43, commitment of instructions executed in a different order to their program order.

In some examples, there may be a one-to-one relationship between program instructions decoded by the decode stage 34 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation. For example, when the control stack load operation is not eliminated, the control stack pop instruction may be split into a control stack load micro-operation and a branch micro-operation.

The load/store unit 8 is used to perform load/store operations to access data in a memory system comprising one or more caches 49 and main memory (not illustrated in the view shown in FIG. 9). A memory management unit (MMU) acting as an example of memory access permissions checking circuitry 10 controls address translations between virtual addresses specified by load/store requests from the load/store unit 8 and physical addresses identifying locations in the memory system, based on address mappings defined in a page table structure stored in the memory system. The page table structure also defines memory attributes which specify access permissions for accessing the corresponding pages of the address space, e.g. specifying whether regions of the address space are read only or readable/writable, specifying which privilege levels are allowed to access the region, specifying whether a region of the address space is the control stack region type described above, and specifying other properties which govern how the corresponding region of the address space can be accessed. Entries from the page table structure may be cached in a translation lookaside buffer (TLB) 11 which is a cache maintained by the MMU 10 for caching page table entries or other information for speeding up access to page table entries from the page table structure shown in memory.

As shown in FIG. 9, the load/store unit 8 may comprise load buffers 46 for buffering load target addresses and other information about pending load operations and store buffers 47 for buffering store target information, store target addresses and other information about pending store operations. The load/store unit 8 comprises hazarding circuitry 48 (which comprises store-to-load forwarding circuitry) for detecting, based on address comparisons, address hazards between respective load/store operations which target overlapping regions of memory address space, and resolving such hazards by holding back younger load/store operations if necessary to ensure that the younger load/store operation observes the outcome of an older load/store operation. Some architectural ordering requirements, such as memory barriers, may also be enforced by the hazarding circuitry 48. In the particular case of an older store hazarding with a younger load, the store-to-load forwarding circuitry may cause the load target information to be loaded for the younger load to be at least partly obtained based on the store target information tracked in the store buffers 47 for the older store operation, which can sometimes avoid a load request needing to be sent to the caches 49 or memory at all. However, such elimination of load requests based on store-to-load forwarding is based on address comparisons between respective load/store operations, as the load/store buffers are structures looked up based on address rather than tracking any nested relation between corresponding push/pop operations. The load/store buffers 46, 47 are not managed as a LIFO structure. Also, store-to-load forwarding may require the load operation that hazards with the corresponding store to be allocated a slot in the load pipeline (e.g. in load buffers 46 or in other queue structures such as the issue queue 38), which consumes load processing bandwidth that may therefore not be available for other load operations. Therefore, if elimination of control stack load operations for control stack pop instructions was to rely solely on store-to-load forwarding, this would still incur a performance cost as the frequent control stack pop instructions expected when the control stack protection is applied to each procedure call/return would occupy many slots in a load pipeline, reducing effective throughput of other operations that represent functionality that would have been executed in the absence of implementing the control stack protection. Hence, it can be useful to provide control stack information tracking circuitry 22 which is separate from the load/store buffers 46, 47, to enable control stack load micro-operations to be eliminated from the pipeline at an earlier stage of the pipeline than the point at which the load operation would reach the load buffers 46 of the load/store unit 8. In cases when the control stack load operation for a control stack pop instruction is not eliminated, the control stack load operation may occupy a slot in the load buffers 46, so the load buffers 46 may be shared structures shared between both non-control-stack load operations and control stack load operations.

Figure 10:
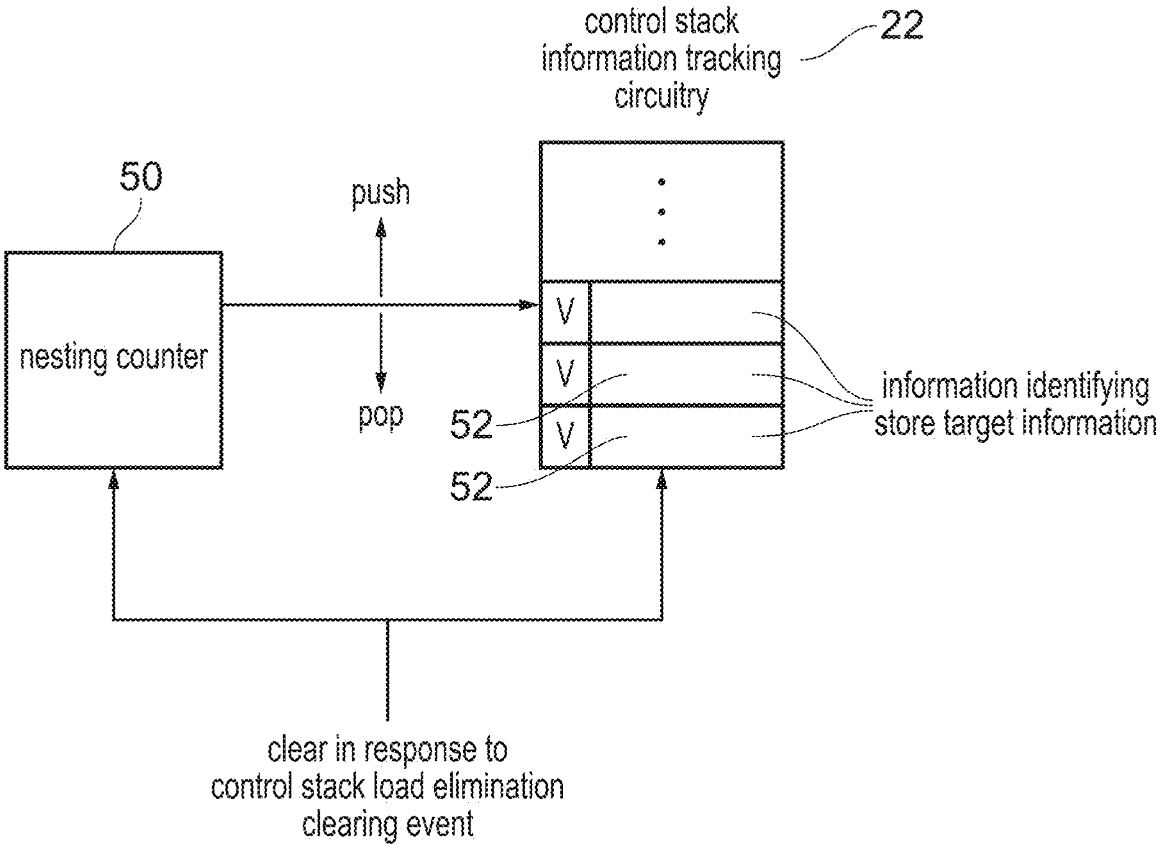
FIG. 10 illustrates an example of control stack information tracking circuitry used in the example of FIG. 9.

In the example of FIG. 9, the control stack load elimination circuitry 20 and the control stack information tracking circuitry 22 are implemented at the decode/rename stages 34, 36, as a control stack load renaming structure. FIG. 10 shows an example implementation of the control stack information tracking circuitry 22, which comprises a nesting counter 50 and a set of LIFO tracking structure entries 52 for specifying tracking information representing the store target information of a corresponding control stack push instruction. The stored tracking information could either represent the return address or other store target information itself, or could indicate a physical register identifier (PTAG) of a physical register that stores the store target information.

In this example, each entry also as a valid indication (V) indicating whether the entry is valid, although in other examples whether a given entry is valid may be implicit from the value of the nesting counter 50 so that the valid indication is not needed.

The nesting counter 50 points to a selected entry of the LIFO structure and is advanced in one direction in response to control stack push instructions identified by the decoder stage 34 and in the opposite direction in response to decoded control stack pop instructions. The nesting counter 50 is cleared to indicate that there are no valid entries on the LIFO structure, when a control stack load elimination clearing event is detected (see step 202 of FIG. 7). In other examples, the nesting tracker which tracks level of nesting of control stack push instructions could be implemented in other ways, not using a counter, such as using a pointer which points to the address at the top of the stack.

It can be particularly useful if the LIFO structure tracks physical register identifiers assigned by the rename circuitry 36 for storing the store target information associated with corresponding control stack push instructions. This means there is no need to transfer the store target information itself between the register file 12 and the control stack information tracking circuitry 22 and means that each entry of the LIFO structure can be smaller as typically a register identifier has fewer bits than the store target information itself. It also means that the control stack information tracking circuitry 22 can be updated at the rename stage even before the store target information has been computed. Hence, for a control stack push instruction, the rename stage 36 may allocate a physical register for storing the store target information (e.g. return address) that will be stored to the control stack in a control stack store operation, and the rename stage 36 and/or control stack load elimination circuitry 20 may save the identifier of that physical register to the entry on the LIFO structure in the control stack information tracking circuitry 22 pointed to by the nesting counter 50, and update the nesting counter 50 to point to the next LIFO entry. For a control stack pop instruction, provided the tracking indications 50, 22 have not been cleared due to a control stack load elimination clearing event in the meantime, the control stack load elimination circuitry 20 obtains the physical register identifier of the entry pointed to by the nesting counter 50 from the LIFO structure, and controls the rename stage 36 to issue the relevant micro-operation (e.g. a branch micro-operation) specifying that the load target information is available from the identified physical register, eliminating the need to issue a control stack load micro-operation. The nesting counter 50 is also adjusted to indicate that the popped LIFO entry is no longer in use, by updating the nesting counter in the opposite direction from the direction in which it is advanced in the case of a control stack push instruction.

Figure 11:
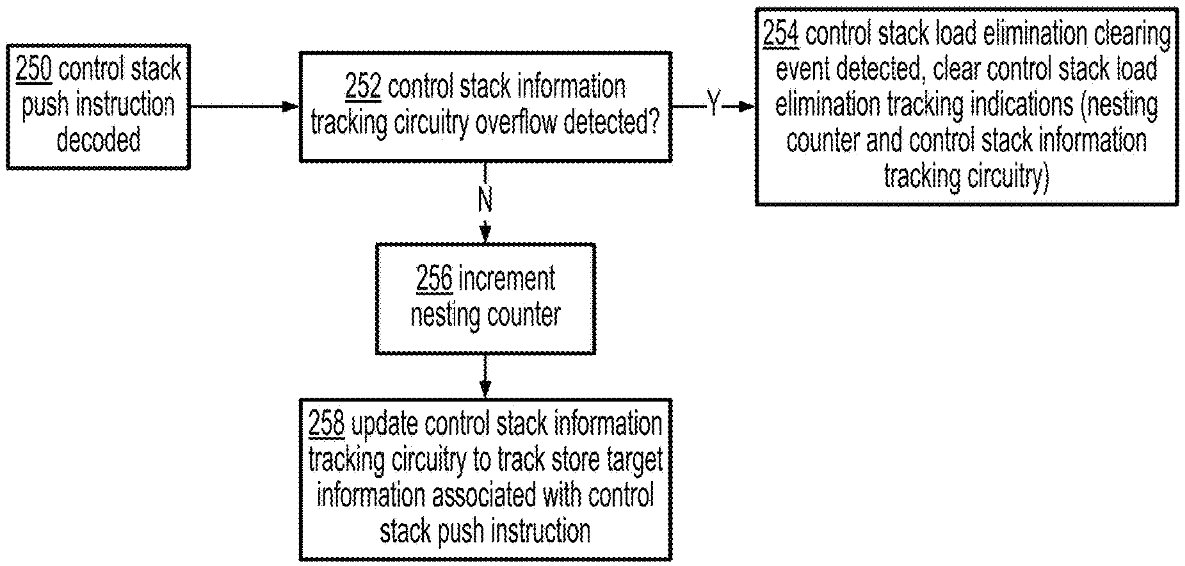
FIG. 11 illustrates handling of a control stack push instruction, in an apparatus according to the example of FIG. 9.

FIG. 11 illustrates a method for controlling updating of the control stack information tracking circuitry 22. At step 250, a control stack push instruction is decoded. At step 252, the control stack information tracking circuitry 22 determines whether an overflow of its LIFO structure is detected (e.g. this occurs when all available LIFO entries have already been used to track information for previous control stack push instructions). If so, then at step 254 the control stack load elimination clearing event is detected, which causes any control stack load elimination tracking indications to be cleared (e.g. clearing the nesting counter 50 and/or LIFO entries of the tracking circuitry 22), to prevent subsequent load elimination. If there was no overflow event then at step 256 the nesting counter 50 is incremented and at step 258 the control stack information tracking circuitry 22 is updated to track the store target information associated with the control stack push instruction (e.g. either writing the store target information itself to the tracking structure or writing an indication of a physical register identifier of a register from which the store target information can be obtained).

FIG. 11 shows one example of responding to overflow of the control stack information tracking circuitry. Other examples could use a different approach, e.g. stop control stack load elimination for newer push/pop pairs seen since the overflow (tracked using a counter for example), but once these are all complete then resume using information from the control stack information tracking circuitry for eliminating the control stack loads on subsequent pops. Alternatively, the oldest entries can be overwritten with information from newer pushes seen since the overflow, and then number of overwritten entries can be tracked, to control the control stack load elimination to be disabled when program flow reaches the outer-most pop events having already used each correct entry of the control stack information tracking circuitry. Hence, it will be appreciated that there can be a variety of techniques for dealing with overflow events.

Figure 12:
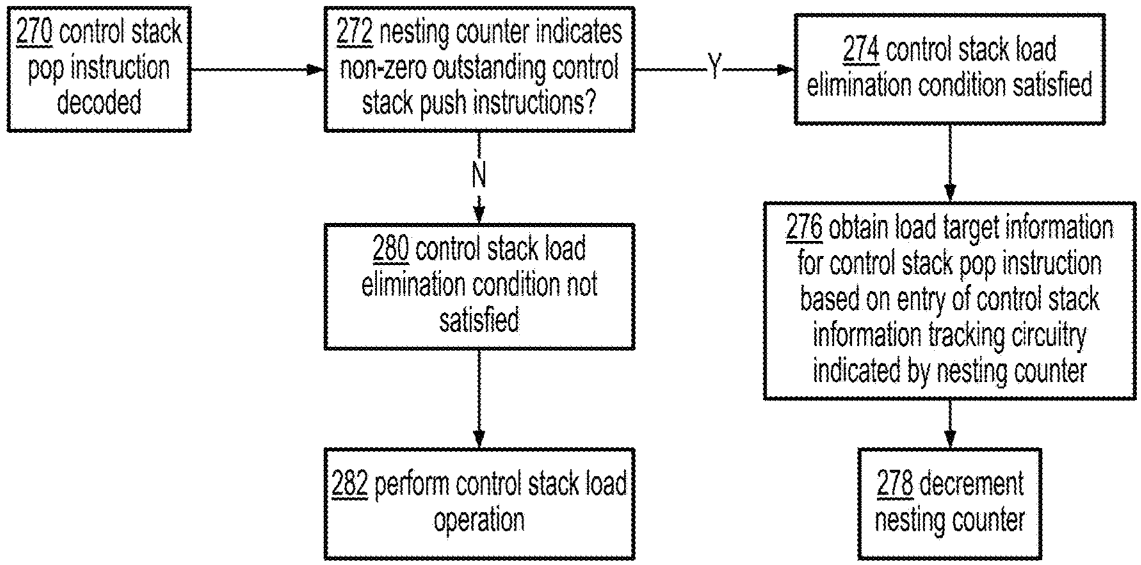
FIG. 12 illustrates handling of a control stack pop instruction, in an apparatus according to the example of FIG. 9.

FIG. 12 illustrates a method for controlling control stack load elimination based on the example of FIGS. 9 and 10. At step 270, a control stack pop instruction is decoded. At step 272, the control stack load elimination circuitry 20 determines whether the nesting counter 50 indicates a non-zero number of outstanding control stack push instructions. If the number of outstanding control stack push instructions is non-zero (e.g. the nesting counter 50 has a value other than its reset value to which it is reset at processor reset or in response to a control stack load elimination clearing event), then at step 274 the control stack load elimination circuitry 20 determines that the control stack load elimination condition is satisfied, and at step 276 the control stack load elimination circuitry 20 controls the processing circuitry 6 to obtain load target information for the control stack pop instruction based on the entry 52 of the control stack information tracking circuitry 22 indicated by the nesting counter 50. For example, a register identifier obtained from that entry 52 is provided to the execute stage 40 so that the load target information can be obtained from a corresponding register 12. At step 278 the nesting counter 50 is decremented. The control stack load micro-operation which would otherwise be issued is eliminated. If at step 272 the nesting counter 50 indicates that the number of outstanding control stack push instructions is zero (either because there have been no such control stack push instructions, or because any tracking indications were cleared in response to a control stack load elimination), then at step 280 the control stack load elimination condition is determined not to be satisfied. At step 282, the processing circuitry 6 is controlled to perform a control stack load operation to load the load target information from the control stack structure in memory.

Figure 13:
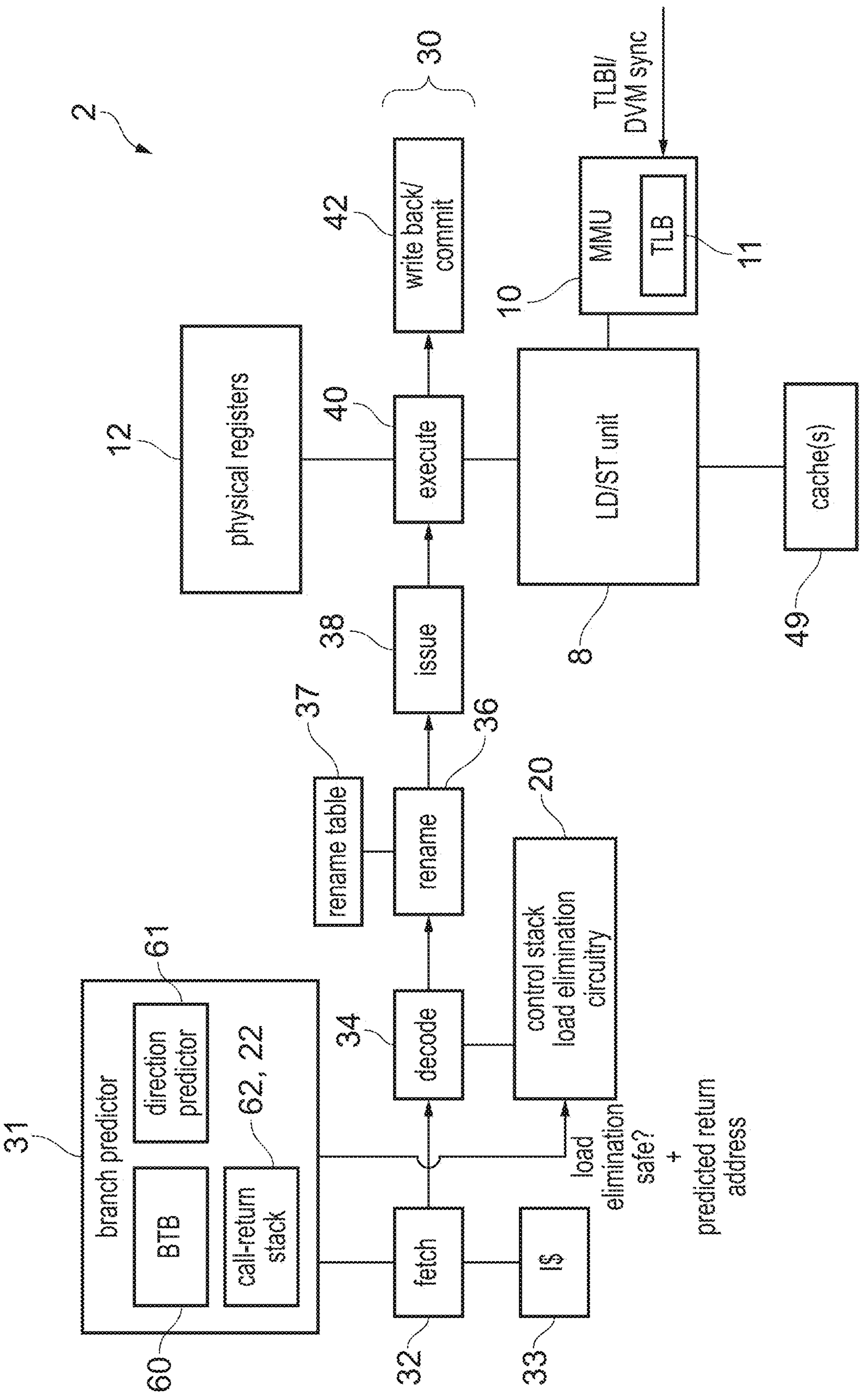
FIG. 13 illustrates a second example apparatus supporting control stack load elimination for procedure return branch instructions.

FIG. 13 illustrates a second example of implementing the control stack load elimination circuitry 20 and control stack information tracking circuitry 22. The pipeline stages 32-42 of pipeline 30, load/store unit 8, rename table 37, registers 12, instruction cache 33, data caches 49, and MMU 10 are the same as shown in FIG. 9 (and although the reorder buffer 43 is not explicitly shown, a reorder buffer can still be provided in the example of FIG. 13).

FIG. 13 shows in more detail components of the branch predictor 31 used to predict outcomes of branch instructions so that fetch stage 32 can start fetching subsequent instructions beyond a branch before the actual outcome of the branch is determined by the execute stage 40. Branch predictor 31 includes a branch target buffer (BTB) 60 which caches branch type information, branch target address information and other information relating to instruction addresses for which at least one taken branch has previously been encountered, and is used to predict whether, when program flow reaches a given address, a taken branch is predicted to occur corresponding to that address, and if so, the predicted target address to which the branch should be taken. Branch predictor 31 also includes a direction predictor 61 which is used to predict, for a conditional branch predicted by the BTB 60 to arise at a particular instruction address, whether that conditional branch is likely to be taken or not for a given instance of encountering the branch. The branch predictor 31 also includes a call-return stack 62 used to predict return addresses for procedure return branch instructions. Hence, when an instruction address subject to branch prediction is predicted to correspond to a procedure calling branch instruction, a return address computed based on the address of the predicted procedure calling branch instruction is pushed to the call-return stack 62, and when an instruction address subject to branch prediction is predicted to correspond to a procedure return branch instruction, the entry at the top of the call-return stack 62 is popped from the call-return stack to obtain the predicted return address of the procedure return branch instruction. Any known branch prediction technique may be used to maintain the BTB 60, direction predictor 61 and call-return stack 62 based on earlier branch predictions made and the outcomes of executed branch instructions at the execute stage 40, and predict outcomes of subsequent branch instructions.

Hence, as the branch predictor 31 already includes a structure 62 used to track return addresses for procedure return branch instructions for the purpose of branch prediction, when such procedure return branch instructions are executed in a control stack enabled mode, the return address which would be returned by the control stack load operation for the procedure return branch may already be available from the call-return stack 62 and if so the control stack load operation can be eliminated. Hence, the call-return stack 62 of the branch predictor 31 can be reused as the control stack information tracking circuitry 22 used by the control stack load elimination circuitry 20 to control elimination of control stack load operations for procedure return branch instructions.

There may be some scenarios where it would not be safe to use a return address from the call-return stack 62 to substitute for the return address indicated by the load target information loaded by the control stack load operation for a procedure return branch instruction executed in the control stack enabled mode. The call-return stack 62 is maintained by the branch predictor 31 based on predictions of instructions expected to be procedure calling/return branch instructions, and those predictions may be incorrect (e.g. an additional procedure calling/return branch may be decoded by decoder 34 which was not anticipated by the branch predictor 31, e.g. because this is the first time that particular branch has been executed). Hence, sometimes the call-return stack predictions may not be correct. However, it is recognised that on most occasions of incorrect prediction of procedure calling/return branch instructions by the branch predictor 31, this can be resolved by the flush event that would in any case be triggered by the execute stage 40 once the branch misprediction is discovered, so does not need special action for the control stack load elimination circuitry 20. However, there can be some scenarios when the branch prediction circuitry may generate a prediction of the return address for a procedure return, but cannot be sure that the prediction is accurate. For example, such scenarios may arise if the call-return stack 62 has overflowed (encountered a predicted procedure calling branch when all available call-return stack entries have already been used) and in that case it may be undesirable to allow the predicted return address from the call-return stack 62 to be used to support elimination of control stack load operations. Hence, the branch predictor 31 may provide the control stack load elimination circuitry 20 with a control stack load-elimination-safety indication which indicates whether it is safe to use a predicted return address provided for a predicted procedure return branch instruction to support elimination of the corresponding control stack load operation. Also, the control-stack-load-elimination-safety indication may indicate that control stack load elimination is unsafe in cases where a procedure return branch instruction fails to be predicted at all by the branch predictor 31 and so is identified at the decode stage 34 without any valid return address being provided from the call-return stack 62. The control stack load elimination circuitry 20 uses the control-stack-load-elimination-safety indication to determine whether the control stack load elimination condition is satisfied.

Figure 14:
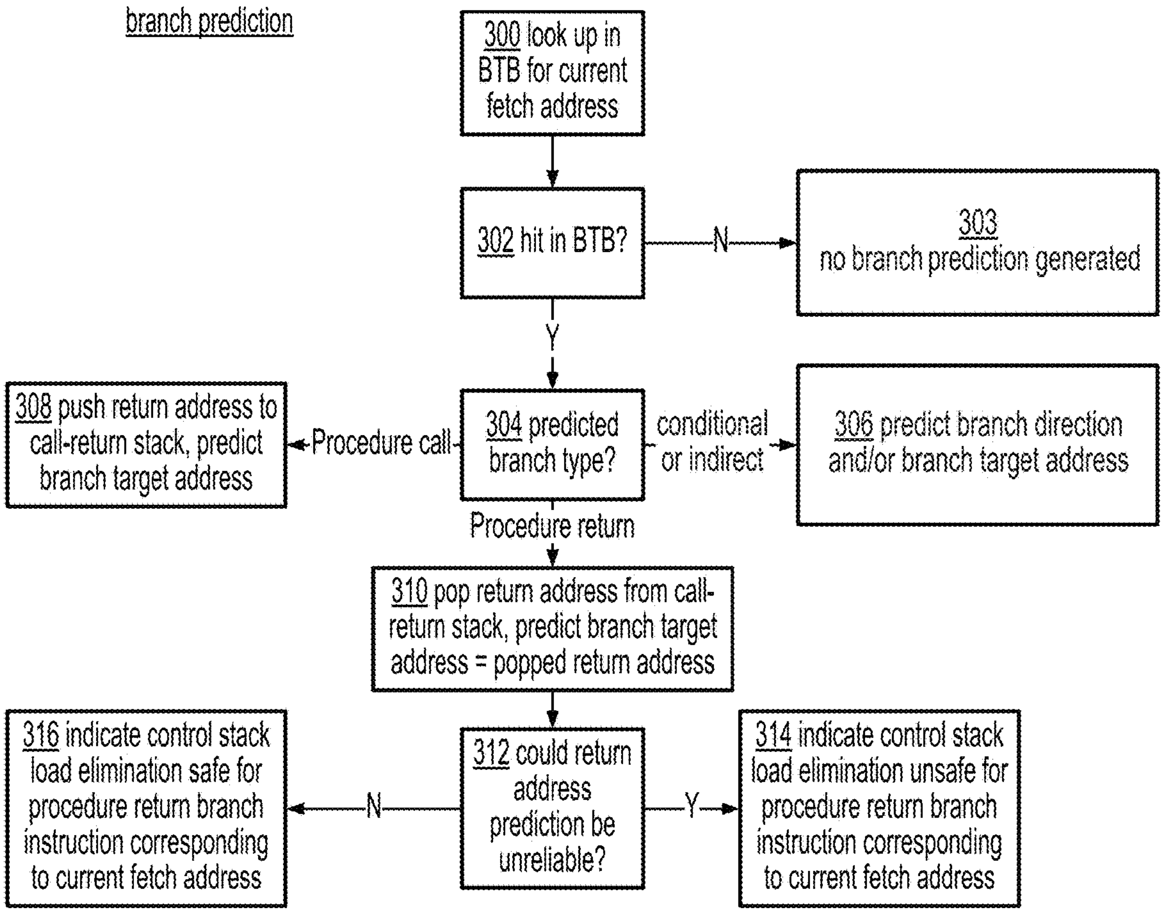
FIG. 14 illustrates steps for branch prediction used in the second example shown in FIG. 13.

FIG. 14 illustrates steps for generating branch predictions using the branch predictor 31. At step 300, a current fetch address representing a current point of program flow is looked up in the BTB 60 to identify whether a corresponding BTB entry exists (i.e. whether there is a hit in the BTB—step 302). If a miss is detected (there is no valid BTB entry corresponding to the fetch address), then at step 303 no branch prediction is generated.

If a hit is detected in the BTB, then at step 304 the branch predictor 31 identifies the predicted branch type of a branch predicted by the hit BTB entry to arise at the current fetch address (or predicted to arise in a block of instructions starting from the current fetch address—in that case the hit BTB entry may also identify the offset of the instruction address of the predicted branch relative to the current fetch address). If the predicted branch type is a conditional branch instruction or indirect branch, then at step 306 the branch predictor 31 predicts the branch direction (whether the branch is predicted taken or not taken) using the branch direction predictor 61 and/or predicts the branch target address using the hit entry of the BTB 60 (or from another prediction structure—some implementations may support additional structures for predicting target addresses).

If the predicted branch type is a procedure calling branch, then at step 308, a return address is determined based on the instruction address of the predicted procedure calling branch instruction and the return address is pushed to the call-return stack 62. The branch target address of the predicted procedure calling branch instruction is determined from the hit BTB entry 60 or from another prediction structure.

If the predicted branch type is a procedure return branch instruction, then at step 310 the entry at the top of the call-return stack 62 is popped and used to predict the return address to be used as the target address for the predicted procedure return branch instruction.

At step 312, the branch predictor 31 determines whether there is any reason why the return address predicted at step 310 could be unreliable. While for branch predictions, the penalty of a misprediction is low as the delay caused by flushing incorrectly processed instructions and resuming fetching from the correct branch target may be much the same as if no prediction is made, for control stack load elimination, to avoid the need to use confirmation loads to verify whether it was correct to eliminate the load, the load is not eliminated in cases where the return address prediction could be unreliable. Scenarios when the return address prediction could be unreliable can include cases where there has been an overflow or underflow of the call-return stack 62 since the most recent flush event triggered by a branch misprediction.

If the return address predicted at step 310 could be unreliable, then at step 314 the branch predictor 31 indicates to the control stack load elimination circuitry, using the control-stack-load-elimination-safety indication, that control stack load elimination would be unsafe for any procedure return branch instruction detected by the decode stage 34 as corresponding to a block of instructions identified based the current fetch address. If the return address predicted at step 310 is determined to be reliable (e.g. no overflow or underflow of the call-return stack has been seen since the most recent flush), then at step 316 the branch predictor 31 indicates to the control stack load elimination circuitry, using the control-stack-load-elimination-safety indication, that control stack load elimination would be safe for any procedure return branch instruction detected by the decode stage 34 as corresponding to a block of instructions identified based the current fetch address.

Figure 15:
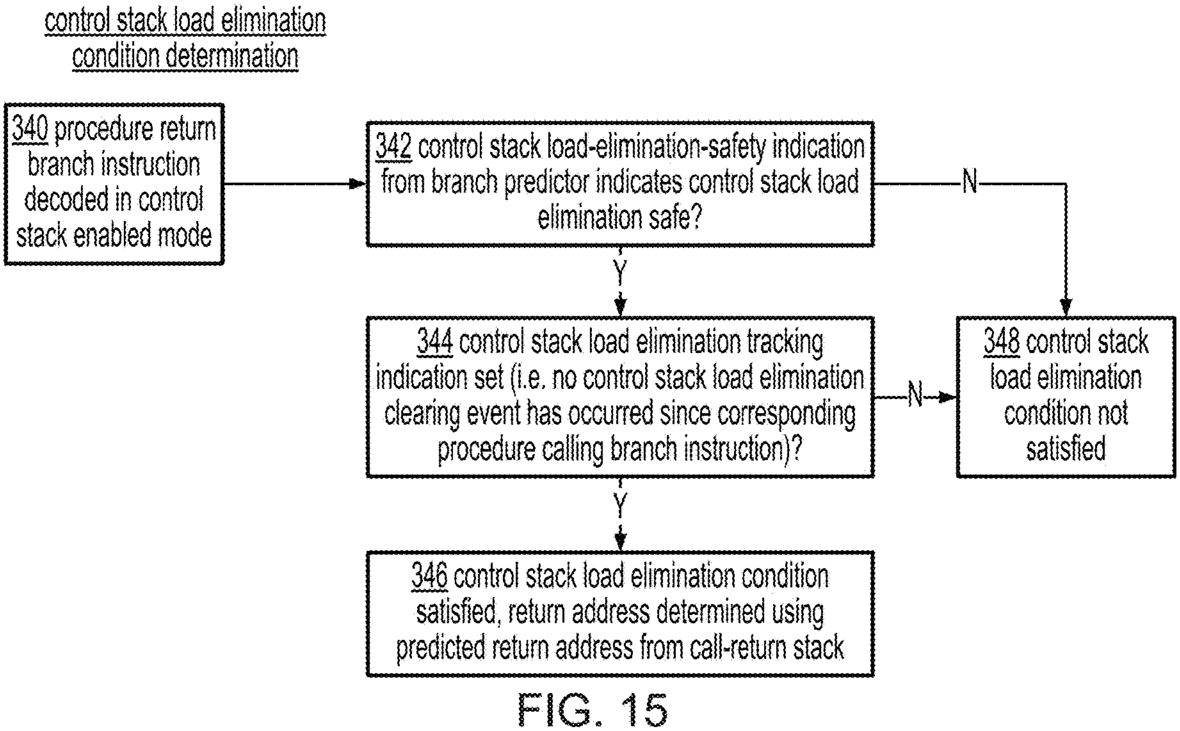
FIG. 15 illustrates determination of the control stack load elimination condition, in an example according to FIG. 13.

FIG. 15 illustrates steps for eliminating control stack load operations when reusing the call-return stack 62 as the control stack information tracking circuitry 22. At step 340, a procedure return branch instruction is decoded by decode stage 34 in the control stack enabled mode. At step 342 the control stack load elimination circuitry 20 determines whether the control-stack-load-elimination-safety indication indicates that control stack load elimination is safe or unsafe. If control stack load elimination would be safe, and at step 344 the control stack load elimination circuitry 20 determines that any control stack load elimination tracking indication is still set to indicate that there has been no control stack load elimination clearing event since a corresponding procedure calling branch instruction was encountered, then at step 346 the control stack load elimination condition is determined to be satisfied, and the return address for the procedure return branch instruction is determined using the predicted return address provided by the call-return stack 62. The control stack load for the return branch instruction can be eliminated. If control stack load elimination is deemed unsafe or any control stack load elimination clearing event has occurred since the corresponding procedure calling branch instruction was detected, then at step 348 the control stack load elimination condition is not considered satisfied and so any control stack load operation corresponding to the procedure calling branch instruction is performed to obtain the return address (or information for validating the return address) from the control stack structure in memory.

Figure 16:
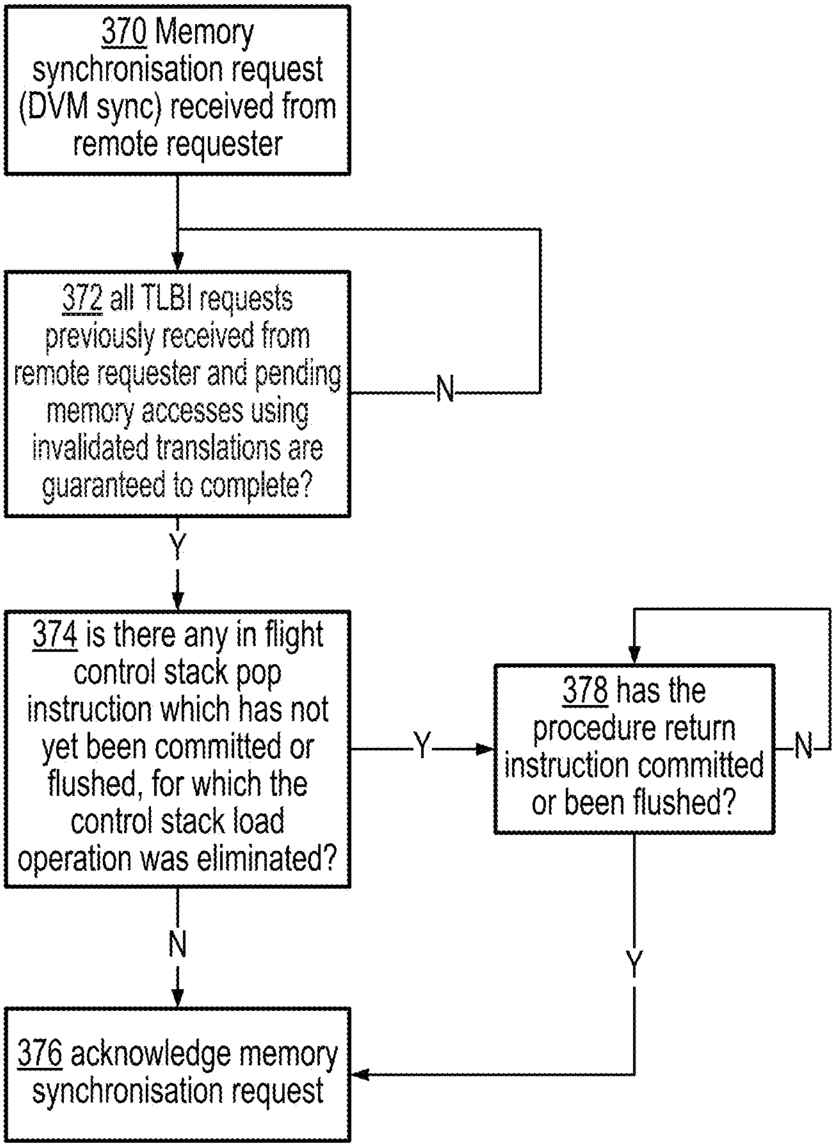
FIG. 16 illustrates steps for handling of a memory synchronisation request received from a remote requester.

FIG. 16 illustrates steps for handling a memory synchronisation request (also known as DVM (distributed virtual memory) sync) received from a remote requester. As shown in FIGS. 9 and 13, the MMU 10 of the processor 2 may receive TLB invalidation (TLBI) requests and DVM sync requests from a remote requester (e.g. another processor in a multi-processor system comprising processor 2). The TLBI requests are requests that entries of the TLB 11 meeting certain invalidation criteria are to be invalidated from the TLB 11. A DVM sync request may request that the MMU 10 returns an acknowledgement that all previously received TLBI requests from the remote requester received prior to the DVM sync request are guaranteed to complete. The DVM sync request can be helpful to avoid the MMU 10 needing to individually acknowledge each separate TLBI request, and can be helpful for the remote requester to control ordering of operations which might need to be delayed until it can be guaranteed that no subsequently issued memory transactions can be processed based on potentially out of date translation table mappings/permissions.

However, when a control stack load operation is eliminated for a control stack pop instruction (e.g. procedure return branch instruction executed in the control stack enabled mode), and the read permissions for that eliminated load are checked at the time of an earlier control stack push instruction as at step 120 of FIG. 5 described above, this means that the control stack load has effectively (from the point of view of which version of memory access permissions is enforced on the load) been pulled ahead of the time that the control stack pop instruction is actually encountered. If a TLBI request causing invalidation of an entry used to check the read permission for the control stack load was received in the period between encountering the control stack push instruction and the control stack pop instruction, then if a DVM sync is received and acknowledged before the control stack pop instruction is committed, there could be a risk that the control stack pop instruction might be processed based on old memory access permissions prior to the TLB invalidation triggered by the TLBI request, despite the DVM sync obtaining a guarantee that no subsequent operations (including the control stack pop instruction) will be processed based on the old memory access permissions anymore. This could violate architectural ordering requirements. To address this problem, if there is a pending in-flight control stack pop instruction at the time a DVM sync (memory synchronisation request) is received, and the control stack load operation was eliminated for that in-flight control stack pop instruction, the acknowledgement of the DVM sync can be delayed until the control stack pop instruction is either committed or flushed from the pipeline, allowing architectural ordering requirements to be respected.

Hence, as shown in FIG. 16, at step 370 a memory synchronisation request (DVM sync) is received from a remote requester. The MMU 10 checks at step 372 whether all previously received TLBI requests from the remote requester are guaranteed to complete and that any pending memory accesses using old translations (translations that are invalidated in response to the TLBI requests) are also complete. The MMU 10 also checks at step 374 whether there is any in flight control stack pop instruction which has not yet been committed or flushed, for which the control stack load operation was eliminated. The memory synchronisation request can be acknowledged to the remote requester at step 376, once all earlier TLBI requests are guaranteed to complete and there are no remaining uncommitted in-flight control stack pop instructions for which the control stack load operation was eliminated. If an uncommitted/unflushed control stack pop instruction for which the control stack load operation was eliminated is still pending at step 374, then at step 378 the MMU 10 waits for that instruction to be committed or flushed before acknowledging the memory synchronisation request at step 376.

Concepts described herein may be embodied in a system comprising at least one packaged chip. The apparatus 2 described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 17:
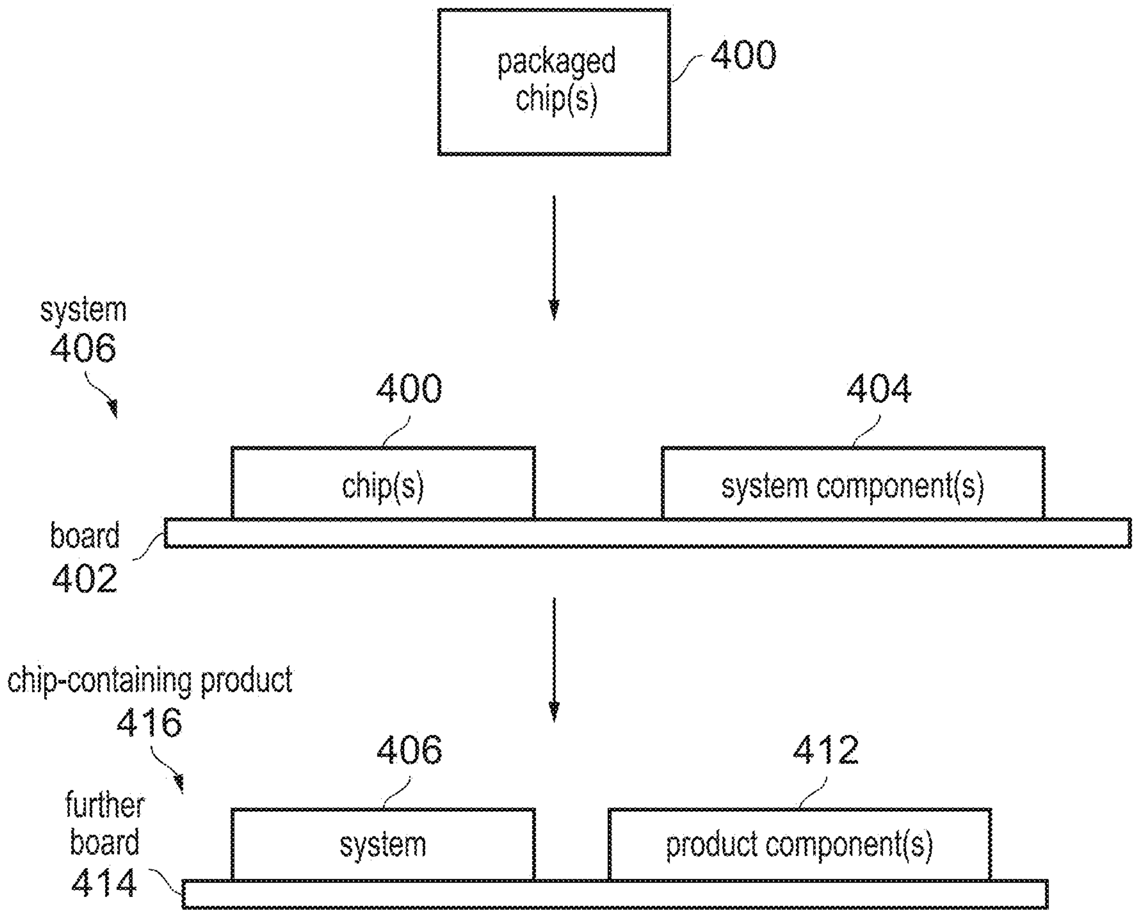
FIG. 17 illustrates a system and a chip-containing product.

As shown in FIG. 17, one or more packaged chips 400, with the apparatus 2 described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus 2 described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   processing circuitry to:
     in response to a control stack push instruction, perform a control stack store operation to request that store target information is stored to a memory system location corresponding to a control stack store target address derived from a control stack pointer; and
     in response to a control stack pop instruction processed when a control stack load elimination condition is not satisfied, perform a control stack load operation to request that load target information is loaded from a memory system location corresponding to a control stack load target address derived from the control stack pointer;
   control stack information tracking circuitry to track, in a last-in-first-out structure, one or more entries tracking items of store target information corresponding to one or more control stack push instructions; and
   control stack load elimination circuitry to:
     determine whether the control stack load elimination condition is satisfied for a given control stack pop instruction; and
     in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction.
2. The apparatus according to clause 1, wherein the control stack load elimination circuitry is configured to determine whether the control stack load elimination condition is satisfied for the given control stack pop instruction, based on a nesting tracker tracking a level of nesting of control stack push instructions.

3. The apparatus according to any of clauses 1 and 2, wherein in response to detecting a control stack load elimination clearing event associated with an intervening point of program flow between the corresponding control stack push instruction and a subsequent control stack pop instruction, the control stack load elimination circuitry is configured to clear at least one control stack load elimination tracking indication to ensure that the control stack load elimination condition is not satisfied for the subsequent control stack pop instruction.
4. The apparatus according to clause 3, wherein the control stack load elimination clearing event comprises a control stack store instruction other than the control stack push instruction.
5. The apparatus according to any of clauses 3 and 4, wherein the control stack load elimination clearing event comprises an instruction to update the control stack pointer.
6. The apparatus according to any of clauses 3 to 5, wherein the control stack load elimination clearing event comprises a control stack synchronisation instruction which enforces a requirement that an effect of an older control stack store operation is made visible to a younger non-control stack load/store operation for which an address range accessed by the given older control stack store operation overlaps with an address range accessed by the younger non-control stack load/store operation.
7. The apparatus according to any of clauses 3 to 6, wherein the control stack load elimination clearing event comprises a cache invalidation instruction for triggering invalidation of one or more entries of a cache.
8. The apparatus according to any of clauses 3 to 7, wherein the control stack load elimination clearing event comprises a translation lookaside buffer invalidation instruction for triggering invalidation of one or more entries of a translation lookaside buffer, or a memory synchronisation request requesting an acknowledgement that one or more preceding translation lookaside buffer invalidation requests are guaranteed to complete.
9. The apparatus according to any of clauses 3 to 8, wherein the control stack load elimination clearing event comprises a flush event associated with the intervening point of program flow, to cause one or more instructions younger than the intervening point of program flow to be flushed from being processed by the processing circuitry.
10. The apparatus according to any of clauses 1 to 9, comprising memory access permissions checking circuitry to determine, based on memory access permission information associated with a target address of a given load/store operation, whether the given load/store operation is permitted.
11. The apparatus according to clause 10, wherein in response to the control stack store operation triggered by the control stack push instruction, the memory access permissions checking circuitry is configured to check whether the memory access permission information associated with the control stack store target address indicates that load operations are permitted, and, in response to determining that load operations are not permitted for the control stack store target address, to trigger a response action to ensure a subsequent control stack pop instruction is processed without eliminating the control stack load operation.
12. The apparatus according to clause 11, wherein the response action comprises flushing operations younger than the control stack push instruction for which the memory access permissions checking circuitry detected that load operations are not permitted for the control stack store target address, without flushing the control stack push instruction itself.
13. The apparatus according to any of clauses 10 to 12, wherein the memory access permission information indicates whether a region of memory comprising the target address of the given load/store operation is designated as a control stack type region reserved for access by control stack load/store operations.
14. The apparatus according to clause 13, wherein the memory access permissions checking circuitry is configured to determine that the given load/store operation is not permitted when the given load/store operation is a control stack load/store operation and the memory access permission information associated with the target address of the given load/store operation indicates that the target address is in a region of memory not designated as the control stack type region.
15. The apparatus according to any of clauses 13 and 14, wherein the memory access permissions checking circuitry is configured to determine that the given load/store operation is not permitted when the given load/store operation a store operation, the given load/store operation is not a control stack load/store operation and the memory access permission information associated with the target address of the given load/store operation indicates that the target address is in a region of memory designated as the control stack type region.
16. The apparatus according to any preceding clause, wherein the control stack push instruction comprises a procedure calling branch instruction processed in a control stack enabled mode, the store target information stored in the control stack store operation comprises a return address, and in response to the procedure calling branch instruction, the processing circuitry is configured to branch to a call target address specified by the procedure calling branch instruction; and
the control stack pop instruction comprises a procedure return branch instruction processed in the control stack enabled mode, and in response to the procedure return branch instruction processed in the control stack enabled mode, the processing circuitry is configured to branch to a return branch target address identified by, or validated using, the load target information.
17. The apparatus according to clause 16, wherein, in response to a branch micro-operation issued to the processing circuitry in response to a given procedure return branch instruction processed in the control stack enabled mode when the control stack load operation is eliminated, when a control stack return address check is enabled for the given procedure return branch instruction, the processing circuitry is configured to:
determine, in response to the branch micro-operation, whether an address indicated by an address operand of the given procedure return branch instruction matches the return branch target address identified by, or validated using, the load target information; and
signal an exception in response to detecting a mismatch between the address indicated by the address operand of the given procedure return branch instruction and the return branch target address.

18. The apparatus according to any of clauses 16 and 17, wherein the control stack information tracking circuitry comprises call-return stack circuitry used by branch prediction circuitry to predict the return branch target address of the procedure return branch instruction, wherein the branch prediction circuitry is configured to update the call-return stack circuitry based on return addresses derived from instruction addresses predicted to correspond to procedure calling branch instructions.
19. The apparatus according to clause 18, wherein the control stack data elimination circuitry is configured to determine whether the control stack load elimination condition is satisfied for the given procedure return branch instruction, based on a control-stack-load-elimination-safety indication provided by the branch prediction circuitry indicating whether it is safe to eliminate the control stack load operation for a given procedure return branch instruction based on the return branch target address being predicted using the call-return stack circuitry.
20. The apparatus according to clause 19, wherein, in response to generating a prediction of the return branch target address of the given procedure return branch instruction in a period following an earlier detection of overflow of the call-return stack circuitry:
 the branch prediction circuitry is configured to generate the control-stack-load-elimination-safety indication to indicate that it is unsafe to eliminate the control stack load operation for the given procedure return branch instruction.
21. The apparatus according to any of clauses 1 to 17, wherein the control stack information tracking circuitry comprises a control stack load renaming structure; and
 in response to detecting a control stack push instruction decoded by instruction decoding circuitry, the control stack load elimination circuitry is configured to update the control stack load renaming structure to specify information identifying the store target information associated with the control stack push instruction.
22. The apparatus according to any of clauses 1 to 21, wherein, in response to receipt of a memory synchronisation request from a remote requester when the given control stack pop instruction for which the control stack load operation has been eliminated is not yet committed or flushed, the memory synchronisation request requesting an acknowledgement that one or more preceding translation lookaside buffer invalidation requests are guaranteed to complete:
 the processing circuitry is configured to defer responding to the memory synchronisation request with the acknowledgement until the given control stack pop instruction for which the control stack load operation has been eliminated is guaranteed to be committed or is flushed from being processed by the processing circuitry.
23. The apparatus according to any of clauses 1 to 22, wherein:
 in absence of a control stack synchronisation instruction occurring in program order between a given older control stack store operation and a given younger non-control stack load/store operation for which an address range accessed by the given older control stack store operation overlaps with an address range accessed by the given younger non-control stack load/store operation, the processing circuitry is configured to permit the given younger non-control stack load/store operation to yield a result which fails to observe a result of the given older control stack store operation.
24. The apparatus according to any of clauses 1 to 23, wherein when the control stack load operation has been eliminated for the given control stack pop instruction, the processing circuitry is configured to allow the given control stack push instruction to commit without issuing a confirmation load operation to check whether the store target information obtained from the control stack information tracking circuitry matches a data value stored at the memory system location corresponding to the control stack load target address derived from the control stack pointer.
25. The apparatus according to any of clauses 1 to 24, wherein, in response to the given control stack pop instruction when the control stack load operation has been eliminated, the processing circuitry is configured to apply a same adjustment to the control stack pointer that would have been made in a case when the control stack load operation is not eliminated.
26. The apparatus according to any of clauses 1 to 25, wherein the control stack load elimination circuitry is configured to eliminate the control stack load operation prior to a load micro-operation corresponding to the control stack load operation being issued to the processing circuitry for execution.
27. The apparatus according to any of clauses 1 to 26, comprising load buffering circuitry to buffer pending load operations prior to issuing the load operation to a memory system; and wherein the load buffering circuitry is shared for use by both control stack load operations specifying addresses derived from the control stack pointer and non-control stack load operations specifying addresses determined independent of the control stack pointer.
28. The apparatus according to any of clauses 1 to 27, wherein the control stack load elimination circuitry is configured to determine whether the control stack load elimination condition is satisfied for the given control stack pop instruction, independent of any address comparison between the control stack load target address of the control stack load operation and the control stack store target address of the control stack store operation issued in response to the corresponding control stack push instruction.
29. A system comprising:
 the apparatus of any of clauses 1 to 28, implemented in at least one packaged chip;
 at least one system component; and
 a board,
 wherein the at least one packaged chip and the at least one system component are assembled on the board.
30. A chip-containing product comprising the system of clause 29, wherein the system is assembled on a further board with at least one other product component.
31. Computer-readable code for fabrication of an apparatus comprising:
 processing circuitry to:
  in response to a control stack push instruction, perform a control stack store operation to request that store target information is stored to a memory system location corresponding to a control stack store target address derived from a control stack pointer; and
  in response to a control stack pop instruction processed when a control stack load elimination condition is not satisfied, perform a control stack load operation to request that load target information is loaded from a location corresponding to a control stack load target address derived from the control stack pointer;

control stack information tracking circuitry to track, in a last-in-first-out structure, one or more entries tracking items of store target information corresponding to one or more control stack push instructions; and control stack load elimination circuitry to:

determine whether the control stack load elimination condition is satisfied for a given control stack pop instruction; and in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction.

32. A computer-readable storage medium storing the computer-readable code of clause 31.

33. A method comprising:

in response to a control stack push instruction, performing a control stack store operation to request that store target information is stored to a memory system location corresponding to a control stack store target address derived from a control stack pointer;

tracking, in a last-in-first-out structure provided by control stack information tracking circuitry, one or more entries tracking items of store target information corresponding to one or more control stack push instructions; and in response to a given control stack pop instruction:

determining whether a control stack load elimination condition is satisfied for the given control stack pop instruction;

in response to determining that the control stack load elimination condition is not satisfied for the given control stack pop instruction, performing a control stack load operation to request that load target information is loaded from a memory system location corresponding to a control stack load target address derived from the control stack pointer; and in response to determining that the control stack load elimination condition is satisfied for the given control stack pop instruction, eliminating the control stack load operation corresponding to the given control stack pop instruction and using, as the load target information for the given control stack pop instruction, store target information obtained based on an entry of the control stack information tracking circuitry corresponding to a corresponding control stack push instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry configured to:

in response to a control stack push instruction, perform a control stack store operation to request that store target information is stored to a memory system location corresponding to a control stack store target address derived from a control stack pointer; and in response to a control stack pop instruction processed when a control stack load elimination condition is not satisfied, perform a control stack load operation to request that load target information is loaded from a memory system location corresponding to a control stack load target address derived from the control stack pointer;

control stack information tracking circuitry configured to track, in a last-in-first-out structure, one or more entries tracking items of store target information corresponding to one or more control stack push instructions; and control stack load elimination circuitry configured to:

determine whether the control stack load elimination condition is satisfied for a given control stack pop instruction; and in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction;

wherein in response to detecting a control stack load elimination clearing event associated with an intervening point of program flow between the corresponding control stack push instruction and a subsequent control stack pop instruction, the control stack load elimination circuitry is configured to clear at least one control stack load elimination tracking indication to ensure that the control stack load elimination condition is not satisfied for the subsequent control stack pop instruction.

2. The apparatus according to claim 1, comprising memory access permissions checking circuitry configured to determine, based on memory access permission information associated with a target address of a given load/store operation, whether the given load/store operation is permitted;

wherein the memory access permission information indicates whether a region of memory comprising the target address of the given load/store operation is designated as a control stack type region reserved for access by control stack load/store operations.

3. The apparatus according to claim 1, wherein the control stack push instruction comprises a procedure calling branch instruction processed in a control stack enabled mode, the store target information stored in the control stack store operation comprises a return address, and in response to the procedure calling branch instruction, the processing circuitry is configured to branch to a call target address specified by the procedure calling branch instruction; and the control stack pop instruction comprises a procedure return branch instruction processed in the control stack enabled mode, and in response to the procedure return branch instruction processed in the control stack enabled mode, the processing circuitry is configured to branch to a return branch target address identified by, or validated using, the load target information.

4. The apparatus according to claim 3, wherein, in response to a branch micro-operation issued to the processing circuitry in response to a given procedure return branch instruction processed in the control stack enabled mode when the control stack load operation is eliminated, when a control stack return address check is enabled for the given procedure return branch instruction, the processing circuitry is configured to:

determine, in response to the branch micro-operation, whether an address indicated by an address operand of the given procedure return branch instruction matches the return branch target address identified by, or validated using, the load target information; and signal an exception in response to detecting a mismatch between the address indicated by the address operand of the given procedure return branch instruction and the return branch target address.

5. The apparatus according to claim 3, wherein the control stack information tracking circuitry comprises call-return stack circuitry used by branch prediction circuitry to predict the return branch target address of the procedure return branch instruction, wherein the branch prediction circuitry is configured to update the call-return stack circuitry based on return addresses derived from instruction addresses predicted to correspond to procedure calling branch instructions.

6. The apparatus according to claim 5, wherein the control stack data elimination circuitry is configured to determine whether the control stack load elimination condition is satisfied for the given procedure return branch instruction, based on a control-stack-load-elimination-safety indication provided by the branch prediction circuitry indicating whether it is safe to eliminate the control stack load operation for a given procedure return branch instruction based on the return branch target address being predicted using the call-return stack circuitry.

7. The apparatus according to claim 1, wherein the control stack information tracking circuitry comprises a control stack load renaming structure; and in response to detecting a control stack push instruction decoded by instruction decoding circuitry, the control stack load elimination circuitry is configured to update the control stack load renaming structure to specify information identifying the store target information associated with the control stack push instruction.

8. The apparatus according to claim 1, wherein, in response to receipt of a memory synchronisation request from a remote requester when the given control stack pop instruction for which the control stack load operation has been eliminated is not yet committed or flushed, the memory synchronisation request requesting an acknowledgement that one or more preceding translation lookaside buffer invalidation requests are guaranteed to complete:

the processing circuitry is configured to defer responding to the memory synchronisation request with the acknowledgement until the given control stack pop instruction for which the control stack load operation has been eliminated is guaranteed to be committed or is flushed from being processed by the processing circuitry.

9. The apparatus according to claim 1, wherein when the control stack load operation has been eliminated for the given control stack pop instruction, the processing circuitry is configured to allow the given control stack push instruction to commit without issuing a confirmation load operation to check whether the store target information obtained from the control stack information tracking circuitry matches a data value stored at the memory system location corresponding to the control stack load target address derived from the control stack pointer.

10. The apparatus according to claim 1, wherein the control stack load elimination circuitry is configured to eliminate the control stack load operation prior to a load micro-operation corresponding to the control stack load operation being issued to the processing circuitry for execution.

11. The apparatus according to claim 1, comprising load buffering circuitry to buffer pending load operations prior to issuing the load operations to a memory system; and wherein the load buffering circuitry is shared for use by both control stack load operations specifying addresses derived from the control stack pointer and non-control stack load operations specifying addresses determined independent of the control stack pointer.

12. The apparatus according to claim 1, wherein the control stack load elimination circuitry is configured to determine whether the control stack load elimination condition is satisfied for the given control stack pop instruction, independent of any address comparison between the control stack load target address of the control stack load operation and the control stack store target address of the control stack store operation issued in response to the corresponding control stack push instruction.

13. A system comprising:

the apparatus of claim 1, implemented in at least one packaged chip;

at least one system component; and a board, wherein the at least one packaged chip and the at least one system component are assembled on the board.

14. A chip-containing product comprising the system of claim 13, wherein the system is assembled on a further board with at least one other product component.

15. A non-transitory computer-readable medium storing computer-readable code for fabrication of the apparatus according to claim 1.

16. An apparatus comprising:

processing circuitry configured to:

in response to a control stack push instruction, perform a control stack store operation to request that store target information is stored to a memory system location corresponding to a control stack store target address derived from a control stack pointer; and in response to a control stack pop instruction processed when a control stack load elimination condition is not satisfied, perform a control stack load operation to request that load target information is loaded from a memory system location corresponding to a control stack load target address derived from the control stack pointer;

control stack information tracking circuitry configured to track, in a last-in-first-out structure, one or more entries tracking items of store target information corresponding to one or more control stack push instructions; and control stack load elimination circuitry configured to:

determine whether the control stack load elimination condition is satisfied for a given control stack pop instruction; and in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction;

wherein the control stack load elimination circuitry is configured to determine whether the control stack load elimination condition is satisfied for the given control stack pop instruction, based on a nesting tracker tracking a level of nesting of control stack push instructions.

17. An apparatus comprising:

processing circuitry configured to:

in response to a control stack push instruction, perform a control stack store operation to request that store target information is stored to a memory system location corresponding to a control stack store target address derived from a control stack pointer; and in response to a control stack pop instruction processed when a control stack load elimination condition is not satisfied, perform a control stack load operation to request that load target information is loaded from a memory system location corresponding to a control stack load target address derived from the control stack pointer;

control stack information tracking circuitry configured to track, in a last-in-first-out structure, one or more entries tracking items of store target information corresponding to one or more control stack push instructions;

control stack load elimination circuitry configured to:

determine whether the control stack load elimination condition is satisfied for a given control stack pop instruction; and in response to determining that the control stack load elimination condition is satisfied for the given control stack pop instruction, eliminate the control stack load operation corresponding to the given control stack pop instruction and control the processing circuitry to use, as the load target information for the given control stack pop instruction, store target information obtained based on an entry of the control stack information tracking circuitry corresponding to a corresponding control stack push instruction; and memory access permissions checking circuitry to determine, based on memory access permission information associated with a target address of a given load/store operation, whether the given load/store operation is permitted;

wherein in response to the control stack store operation triggered by the control stack push instruction, the memory access permissions checking circuitry is configured to check whether the memory access permission information associated with the control stack store target address indicates that load operations are permitted, and, in response to determining that load operations are not permitted for the control stack store target address, to trigger a response action to ensure a subsequent control stack pop instruction is processed without eliminating the control stack load operation.

18. The apparatus according to claim 17, wherein the response action comprises flushing operations younger than the control stack push instruction for which the memory access permissions checking circuitry detected that load operations are not permitted for the control stack store target address, without flushing the control stack push instruction itself.

* * * * *